(12) United States Patent
Yao et al.

(10) Patent No.: US 11,982,457 B2
(45) Date of Patent: May 14, 2024

(54) INTERACTIVE TEMPERATURE CONTROL SYSTEM

(71) Applicant: Micron Technology, Inc., Boise, ID (US)

(72) Inventors: Chunhua Yao, Boise, ID (US); Gangotree Chakma, San Jose, CA (US); Bhagyashree Bokade, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 125 days.

(21) Appl. No.: 17/649,271

(22) Filed: Jan. 28, 2022

(65) Prior Publication Data

US 2023/0213232 A1 Jul. 6, 2023

Related U.S. Application Data

(60) Provisional application No. 63/266,217, filed on Dec. 30, 2021.

(51) Int. Cl.
*F24F 11/64* (2018.01)
*F24F 11/47* (2018.01)
(Continued)

(52) U.S. Cl.
CPC .............. *F24F 11/64* (2018.01); *F24F 11/47* (2018.01); *G06N 3/08* (2013.01); *F24F 2110/12* (2018.01);
(Continued)

(58) Field of Classification Search
CPC ........ F24F 11/64; F24F 11/47; F24F 2110/12; F24F 2120/14; F24F 2140/60;
(Continued)

(56) References Cited

U.S. PATENT DOCUMENTS 5,384,716 A * 1/1995 Araki ................. G05D 23/1917
374/112
2008/0073057 A1* 3/2008 Kojima .............. B60H 1/00742
62/179
(Continued)

FOREIGN PATENT DOCUMENTS

JP 2010038375 A * 2/2010
JP 2022067743 A * 5/2022
WO WO-2022059137 A1 * 3/2022

*Primary Examiner* — Alicia M. Choi
(74) *Attorney, Agent, or Firm* — Holland & Hart LLP

(57) ABSTRACT

Methods, systems, and devices for an interactive environmental control system are described. In some examples, operating temperatures for individual zones of an environment may be determined based on inputs received from occupants of the respective zones. For example, a building may be separated into zones, and environmental conditions at each zone may be monitored and adjusted independently. Each occupant of a zone may update their environmental preference and the system may utilize the user inputs to set and adjust an operating temperature for the respective zone based on the occupants' preferences. In some examples, the system may implement machine learning techniques to predict and set operating conditions for the zones based on inputs, such as a history of inputs, from building occupants (e.g., from occupants of a respective zone).

22 Claims, 9 Drawing Sheets

(51) Int. Cl.
*G06N 3/08* (2023.01)
*F24F 110/12* (2018.01)
*F24F 120/14* (2018.01)
*F24F 140/60* (2018.01)

(52) U.S. Cl.
CPC ....... *F24F 2120/14* (2018.01); *F24F 2140/60* (2018.01)

(58) Field of Classification Search
CPC .......... F24F 11/30; F24F 11/46; F24F 11/006; G06N 3/08; B60H 1/00742
See application file for complete search history.

(56) References Cited

U.S. PATENT DOCUMENTS

| | | | |
|---|---|---|---|
| 2008/0191044 A1* | 8/2008 | Park | F24F 11/56 236/51 |
| 2014/0138043 A1* | 5/2014 | Matsumoto | F24F 1/0063 165/11.1 |
| 2015/0075763 A1* | 3/2015 | Kim | B60H 1/00742 165/203 |
| 2016/0320081 A1* | 11/2016 | Nikovski | G06F 16/2228 |
| 2017/0123440 A1* | 5/2017 | Mangsuli | F24F 11/62 |
| 2018/0147676 A1* | 5/2018 | Havard, Jr. | F25B 41/20 |
| 2019/0187634 A1* | 6/2019 | Fan | F24F 11/65 |
| 2019/0368762 A1* | 12/2019 | Kim | F24F 11/56 |
| 2020/0025435 A1* | 1/2020 | De Felice | F24F 11/50 |
| 2021/0180825 A1* | 6/2021 | Oh | F24F 11/67 |
| 2022/0293166 A1* | 9/2022 | Ayyapureddi | G11C 11/40611 |

* cited by examiner

INTERACTIVE TEMPERATURE CONTROL SYSTEM

CROSS REFERENCE

The present application for patent claims the benefit of U.S. Provisional Patent Application No. 63/266,217 by YAO et al., entitled "INTERACTIVE TEMPERATURE CONTROL SYSTEM," filed Dec. 30, 2021, assigned to the assignee hereof, and expressly incorporated by reference in its entirety herein.

FIELD OF TECHNOLOGY

The following relates generally to an interactive environmental control system.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read at least one stored state in the memory device. To store information, a component may write the state in the memory device. In some examples, the information stored by a memory device may be associated with an application that is executed by an electronic device that includes the memory device.

DETAILED DESCRIPTION

Figure 1:
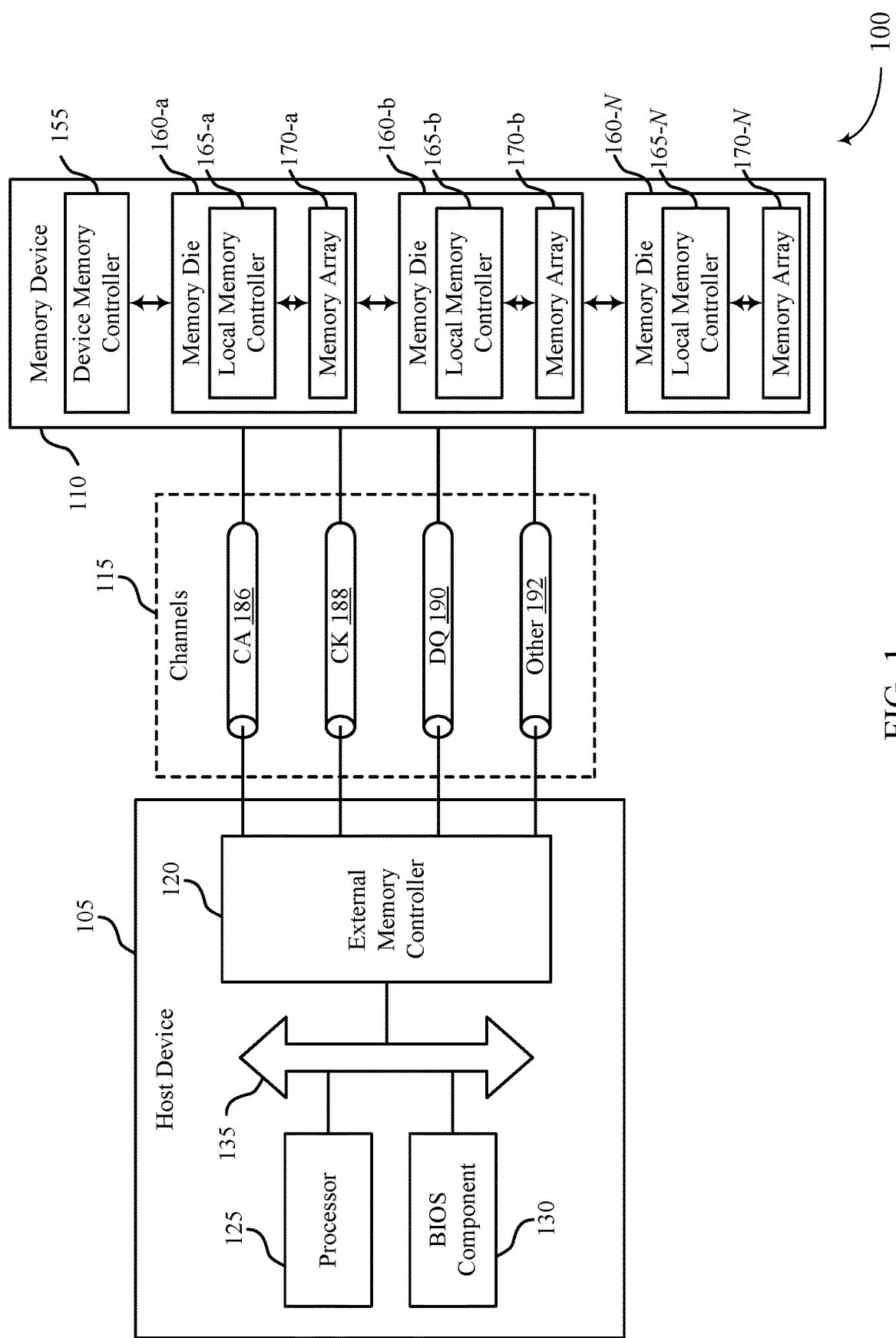
FIG. 1 illustrates an example of a system that supports an interactive environmental control system in accordance with examples as disclosed herein.

Many buildings (e.g., office buildings) utilize a temperature control system to manage (e.g., set, adjust, maintain, etc.) a temperature throughout the building. For example, some temperature control systems may be programmable and may use heating, ventilation, and air conditioning (HVAC) to control the temperature or other environmental conditions (e.g., air flow, pressure, etc.). In some examples, a temperature control system may be programmed based on one or more conditions, such as time (e.g., working hours for employees), seasonal climate, and a temperature preference of a relatively small quantity of users. That is, a programmable system may be limited to the settings or preferences of a single user (e.g., a small quantity of users) for an entire building. In some examples, modern office buildings may have many employees (e.g., even thousands of employees) occupying the building at varying times and with varying temperature preferences. Accordingly, a single fixed temperature for the entire building or subsets may be uncomfortable or otherwise not ideal for many employees as it may not take into account their preferences or schedules. Employee dissatisfaction with the building environment may lead to decreased employee engagement, participation, and productivity. Further, a single fixed temperature for the building or subsets may not be energy efficient, and may result in increased energy consumption over a period of time.

Systems, devices, and techniques related to an interactive environmental control system are described herein. The techniques described herein may enable an interactive environmental control system to receive and implement input from many individual occupants of a building to improve the environmental conditions in the building. For example, an office building may be separated into "zones," which may correspond to areas of the building occupied by at least one employee. In some examples, each zone may be controlled independently from the other zones. Each occupant of the building (e.g., each employee) may be able to update their temperature preference and other information at any time (e.g., via an application that runs on a computing device). The interactive environmental control system may use the individual inputs to set, adjust, or maintain the temperature at each zone based on the input preferences of its current occupants. In some examples, the interactive environmental control system may implement processes and procedures to determine a specific temperature at a zone. For example, the temperature control system may use artificial intelligence (e.g., a machine learning model) to predict a customized temperature based on the current or previous inputs of employees. By customizing the temperature and other programmable environmental conditions at each zone, the interactive environmental control system may improve the overall working conditions of an environment as well as the overall energy efficiency of the building.

Features of the disclosure are initially described in the context of systems and dies as described with reference to FIGS. 1 and 2. Features of the disclosure are described in the context of work environments, schematics, and process flows as described with reference to FIGS. 3-5. These and other features of the disclosure are further illustrated by and described with reference to an apparatus diagram and flowcharts that relate to an interactive environmental control system as described with reference to FIGS. 6-7.

FIG. 1 illustrates an example of a system 100 that supports an interactive environmental control system in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes (wherein such "other circuitry" is hereinafter also referred to in the specification and claims as a "processor"), such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., as host device 105).

In some examples, an interactive environmental control system may include one or more host devices 105. For example, the processor 125 or another component of the host device 105 may be configured to determine an environmental condition for one or more zones of an environment (e.g., of a zone of a building). In other examples, the system 100 may be associated with one or more user devices, such as mobile devices, laptops, and the like. Each user device may include its own host device 105, and the user device may communicate with a server or other aspects of the system that include their own respective host devices 105 to set, maintain, or adjust an environmental condition of an environment.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The memory devices 110 may be an example of random access memory (RAM), read-only memory (ROM), dynamic RAM (DRAM), synchronous dynamic RAM (SDRAM), a static RAM (SRAM), ferroelectric RAM (FeRAM), magnetic RAM (MRAM), resistive RAM (RRAM), flash memory, phase change memory (PCM), self-selecting memory, chalcogenide memory, or not-or (NOR) and not-and (NAND) memory, among other examples. Thus, the memory cells of the memory device 100 may be volatile or non-volatile. Non-volatile memory devices (e.g., NAND memory), may maintain their stored logic state for extended periods of time even in the absence of an external power source. Volatile memory devices, e.g., DRAM, may lose their stored state when disconnected from an external power source.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package. In some examples, the interactive environmental control system may include or be coupled with one or more memory dies 160. For example, the interactive environmental control system may include one or more user devices that each include a respective memory device 110. Moreover, the system 100 may include one or more servers configured to communicate with the respective user devices. The server may include its own memory device 110 that is configured to store environmental inputs and other information related to determining an operational temperature of one or more zones of the system 100.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the interactive environmental control system may include one or more memory devices 110 that each include a respective device memory controller 155. For example, the interactive environmental control system may include one or more servers (e.g., one or more servers associated with a data storage component, a temperature calibration system, a machine learning component, or another component described herein) where are least some if not each may respectively include a device memory controller 155. In some examples, the interactive environmental control system may include a quantity of user devices, which may each include an associated device memory controller 155. In some examples, a device memory controller 155 of a server may access the environmental inputs stored at the memory device 110 and may determine an environmental condition of a zone based on applying an algorithm to the stored data. In some examples, the device memory controller 155 may transmit information (e.g., environmental inputs, determined operational temperatures) to another component of the interactive environmental control system, or to another memory device 110 of the system 100, such as a device memory controller 155 of a user device.

Additionally or alternatively, the interactive environmental control system may implement machine learning techniques to determine the environmental condition for one or more zones. For example, the device memory controller 155 (or another component of the system 100) may utilize a data set (e.g., a data set including one or more of stored user inputs) to predict a temperature for a respective zone based on machine learning models. In some instances, the device memory controller 155 may generate a model based on various inputs (e.g., environmental inputs, secondary environmental inputs) that sets and/or adjusts the environmental condition of a specific zone (or multiple zones).

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

Figure 2:
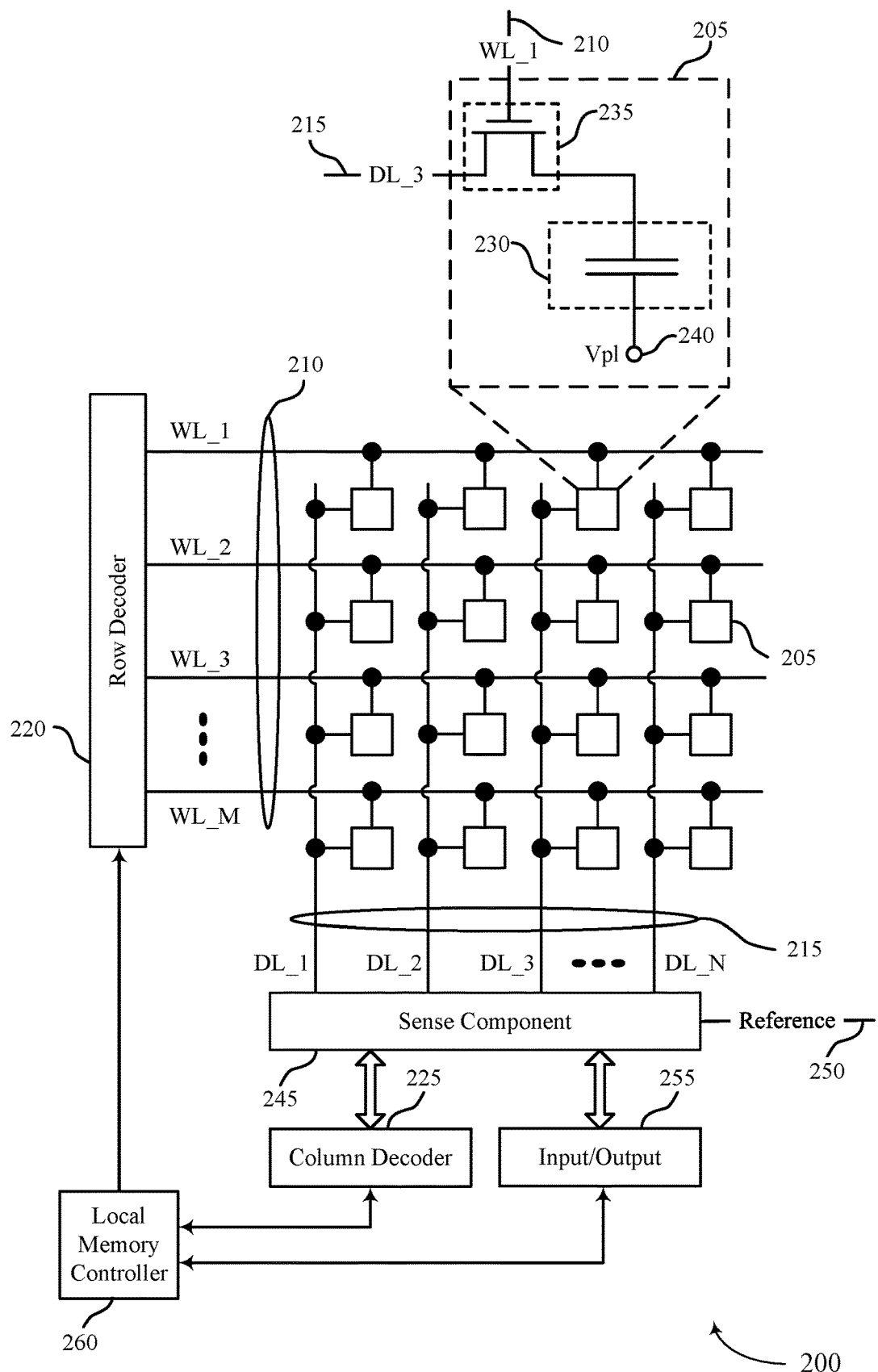
FIG. 2 illustrates an example of a memory die that supports an interactive environmental control system in accordance with examples as disclosed herein.

FIG. 2 illustrates an example of a memory die 200 that supports an interactive environmental control system in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. In some examples, data stored at the memory cells 205 may include environmental inputs received from a quantity of user devices. In some examples, the data may be addressed according to a zone associated with the environmental input, or a time at which the input may have been received.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be operable to couple or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

In some examples, the local memory controller 260 may be associated with a server of an interactive environmental control system and may perform access operations (e.g., read operations, write operations) to store environmental inputs received from one or more user devices. In some examples, the local memory controller 260 may additionally or alternatively store secondary environmental inputs (e.g., dates, times) associated with the environmental inputs. In some examples, the local memory controller 260 may communicate with one or more device memory controllers or local memory controllers 260 of mobile devices to determine an environmental condition based on the stored environmental inputs and other information.

Additionally or alternatively, the interactive environmental control system may implement machine learning techniques to determine the environmental condition for one or more zones. For example, the local memory controller 260 (or another component of the associated system) may utilize a data set (e.g., a data set including one or more of stored user inputs) to predict a temperature for a respective zone based on machine learning models. In some instances, the local memory controller 260 may generate a model based on various inputs (e.g., environmental inputs, secondary environmental inputs) that sets and/or adjusts the environmental condition of a specific zone (or multiple zones).

Figure 3:
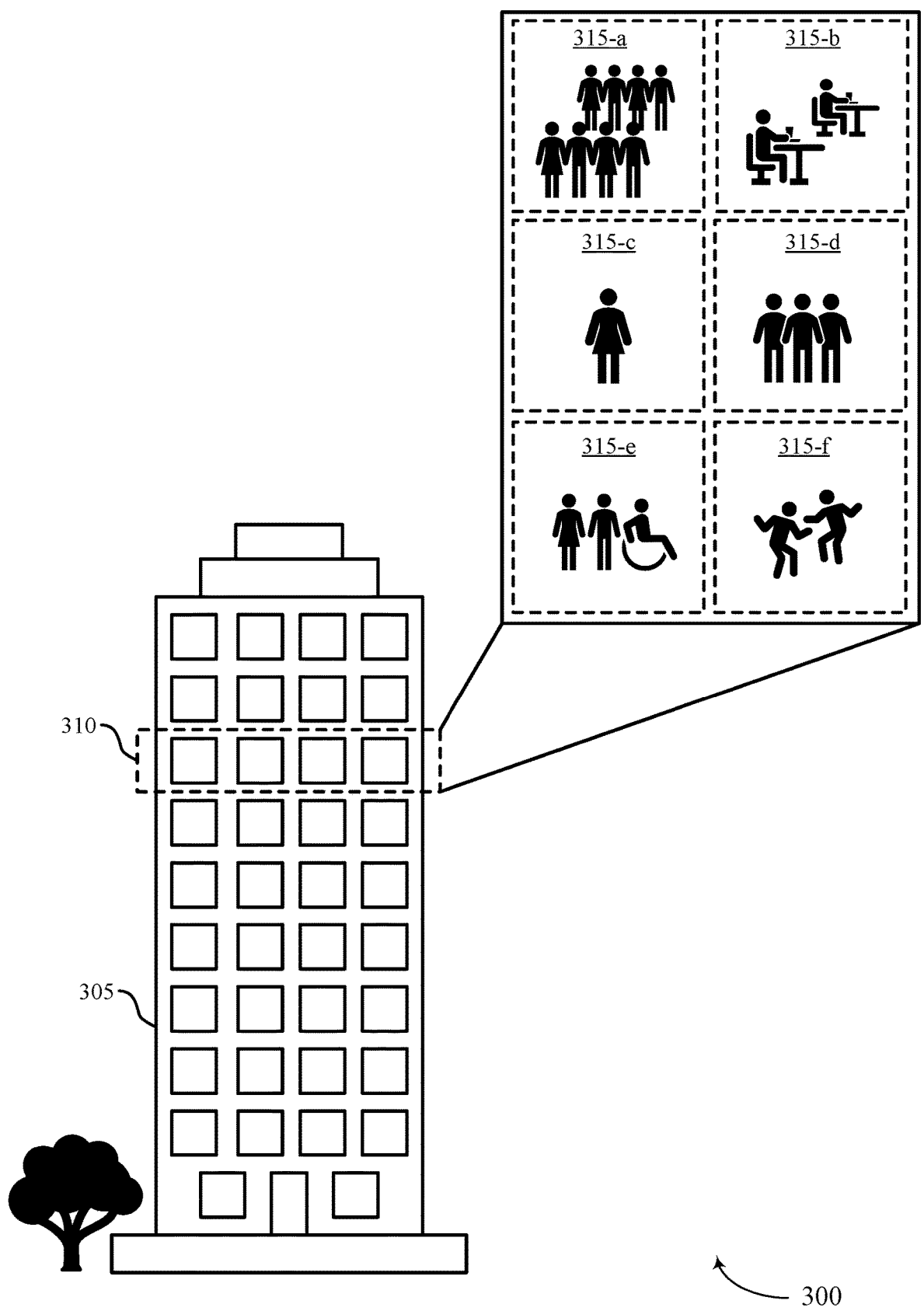
FIG. 3 illustrates an example of an environment that supports an interactive environmental control system in accordance with examples as disclosed herein.

FIG. 3 illustrates an example of an environment 300 that supports an interactive environmental control system in accordance with examples as disclosed herein. The environment 300 may include aspects of a memory system as described with reference to FIGS. 1 and 2. In some cases, the environment 300 may be an example of a work environment. For example, the environment 300 may include a building 305 that includes at least one floor 310. In some examples, each floor 310 may include a quantity of zones 315 (e.g., the zones 315-a through 315-f), which may each include a quantity of occupants (e.g., users, employees). The environment 300 may utilize an interactive environmental control system as described herein, which may improve the overall working conditions of the environment 300 as well as its overall energy efficiency.

As used herein, the term 'zone' may refer an area associated with an employee. For example, a floor 310, a subset or portion of a floor 310, or any such area may be considered to be a zone. In other examples, a "zone" may refer to a subset of workstations (e.g., cubicles) associated with any portion of the building 305 that is dedicated for a particular use (e.g., a lab), company, or division (e.g., a division of a company). In some examples, environmental inputs (e.g., first environmental inputs, second environmental inputs) may be gathered from users (e.g., employees) of each zone 315, and the environmental inputs may be stored at memory devices as described with reference to FIGS. 1 and 2. For example, the interactive environmental control system may be associated with a server including at least one memory device configured to store the environmental inputs.

Moreover, as used herein, the term "first environmental input" may refer to an environmental condition (e.g., a temperature value, an airflow setting) of a zone 315. Additionally or alternatively, the term "second environmental input" may refer to another condition at the zone 315, such as a temporal condition (e.g., date, time) at which a first environmental input is measured or received. In other examples, a "second environmental input" may refer to an external input (e.g., a command from a building administrator). Further, the term "environmental condition" may refer to a temperature value (e.g., an operating temperature) of a zone 315 (e.g., in Fahrenheit (F) or Celsius (C)) that may be determined (e.g., set) based on a combination of first environmental inputs and second environmental inputs. In other examples, an "environmental condition" may refer to another condition, such as an airflow setting (e.g., a fan setting) or a humidity setting.

The building 305 may be an example of an environment 300 that may be occupied by a quantity of people (e.g., employees, clients, visitors, etc.). For example, the building 305 may be an example of an office building. Some areas of the building 305 may have varying quantities of occupants, each with varying environmental preferences (e.g., temperature, air flow, pressure). For example, one or more floors 310 may have a greater or lesser quantity of occupants relative to another floor 310 depending on the day of the week, a time of the day, or the type of work being conducted. In some examples, the environmental preferences of building occupants (e.g., regarding the temperature, or another environmental preference) may differ from occupant-to-occupant based on an individual's attire, recent activity, or mood.

Often, buildings (e.g., the building 305) utilize a temperature control system (e.g., an HVAC system) to manage (e.g., set, adjust, maintain) a standard temperature throughout the building. In some examples, a "smart" HVAC system may adjust the temperature based on a time of day (e.g., lowering the temperature during off-work hours). However, smart systems may implement only a single temperature for an entire environment 300. In some examples, a single temperature may not match the preferences of many occupants of the building 305, and may also lead to energy waste (e.g., due to heating or cooling an unoccupied area).

The building 305 may thus utilize an interactive environmental control system to selectively adjust environmental conditions (e.g., an environmental condition) at individual zones 315 of the environment 300. For example, a floor 310 may include the zones 315-a through 315-f, which may each be temperature-controlled based on environmental inputs and other information. For example, each zone 315 may have its own temperature, which may be independently determined from other adjacent zones 315 (or other zones 315 on the same floor 310 or within the building 305). For example, a single room may include multiple zones 315, which may be maintained at different temperatures based on the environmental inputs from the employees at each zone, among other factors. In some examples, the floor 310 may include a quantity of zones, based on a quantity of occupants, an architectural layout, or another factor. In some examples, a zone 315 may include at least one floor 310 of the building 305. In some examples, a zone 315 may include at least one portion of a floor 310.

In some examples, the boundaries of a zone 315 may be determined based on a quantity of occupants, an amount of walking traffic, or a type or frequency of actives conducted in the area. For example, the zone 315-a may be an open-area workspace occupied by many employees (e.g., a cubicle area, a lab). In some examples, a plurality of first environmental inputs may be received from the occupants of the zone 315-a. In some instances, a first environmental input may include a temperature input (e.g., a temperature value in F or C).

In some examples, the environmental condition at the zone 315-a may be determined based solely on the first environmental inputs, while in other examples the environmental conditions at the zone 315-a may be determined based on both the first environmental inputs and corresponding second environmental inputs. For example, a second environmental input may include a temporal condition (e.g., a day, time, holiday schedule) associated with a first environmental input. In some examples, a second environmental input may include an external input (e.g., from a building administrator) in addition or as an alternative to a temporal condition. As described herein, the interactive environmental control system may determine a different environmental condition for the zone 315-a based on the inputs, and thus may set a different environmental condition based on whether the occupants of a zone 315 are doing office work versus if the occupants are doing temperature-sensitive lab work, as an example. In other examples, the building 305 may be associated with a building administrator who may track environmental conditions associated with the building 305, and may input commands to the interactive control system to adjust an environmental condition of any one zone.

In some examples, the zone 315-b may associated with a different work environment or a different type of work environment than the zone 315-a. For example, the zone 315-b may be a breakroom or cafeteria, which occupants may enter and exit throughout the day. In such an example, the interactive environmental control system may continually adjust the environmental condition at the zone 315-b based on environmental conditions or preferences associated with the current occupants of the zone 315-b. In some examples, the zones 315-c, 315-d, and 315-e may be examples of smaller or larger (e.g., relative to the zone 315-a) zones 315, such as conference rooms that include many occupants, or shared offices that may each include a lesser quantity of occupants.

In some examples, the zone 315-f may be an example of an area where occupants may be more physically active (e.g., a lobby, a gym). For each of the zones 315, the environmental condition may be determined based on a combination of individual environmental inputs, previous environmental inputs (e.g., a history of inputs), zone-specific information (e.g., type of work conducted in that area, architectural considerations, energy efficiency considerations), among other factors.

In some examples, the environmental condition for any one zone 315 may be determined (e.g., set) using an algorithm or machine learning. For example, the algorithm may be used to weigh various inputs (e.g., environmental inputs and other factors) to determine an environmental condition, for the respective zone 315, that reflects individual user preferences as well as energy efficiency and other factors.

The interactive environmental control system may additionally or alternatively implement machine learning techniques to determine the environmental condition for one or more zones 315. For example, the interactive environmental control system may utilize a data set (e.g., a data set including one or more of stored user inputs) to predict a temperature for a zone 315 based on machine learning models.

In some instances, a machine learning component may receive and analyze environmental inputs (e.g., temperature preferences) and associated secondary environmental inputs from users of respective zones. The machine learning component may then be able to predict an environmental condition for a zone (e.g., on various days, at various times of a day, etc.) based on the received inputs. For example, the machine learning component may predict the environmental condition based on any quantity of factors such as the time of day, the quantity of users in a particular zone, a day of the week, or based on other factors in addition to the environmental inputs received form the users of a zone. By selectively adjusting the temperature of zones 315 based on individual user input and other factors, the interactive environmental control system may improve working conditions of employees, which may improve employee productivity, and may improve the overall energy efficiency of the building 305.

Figure 4:
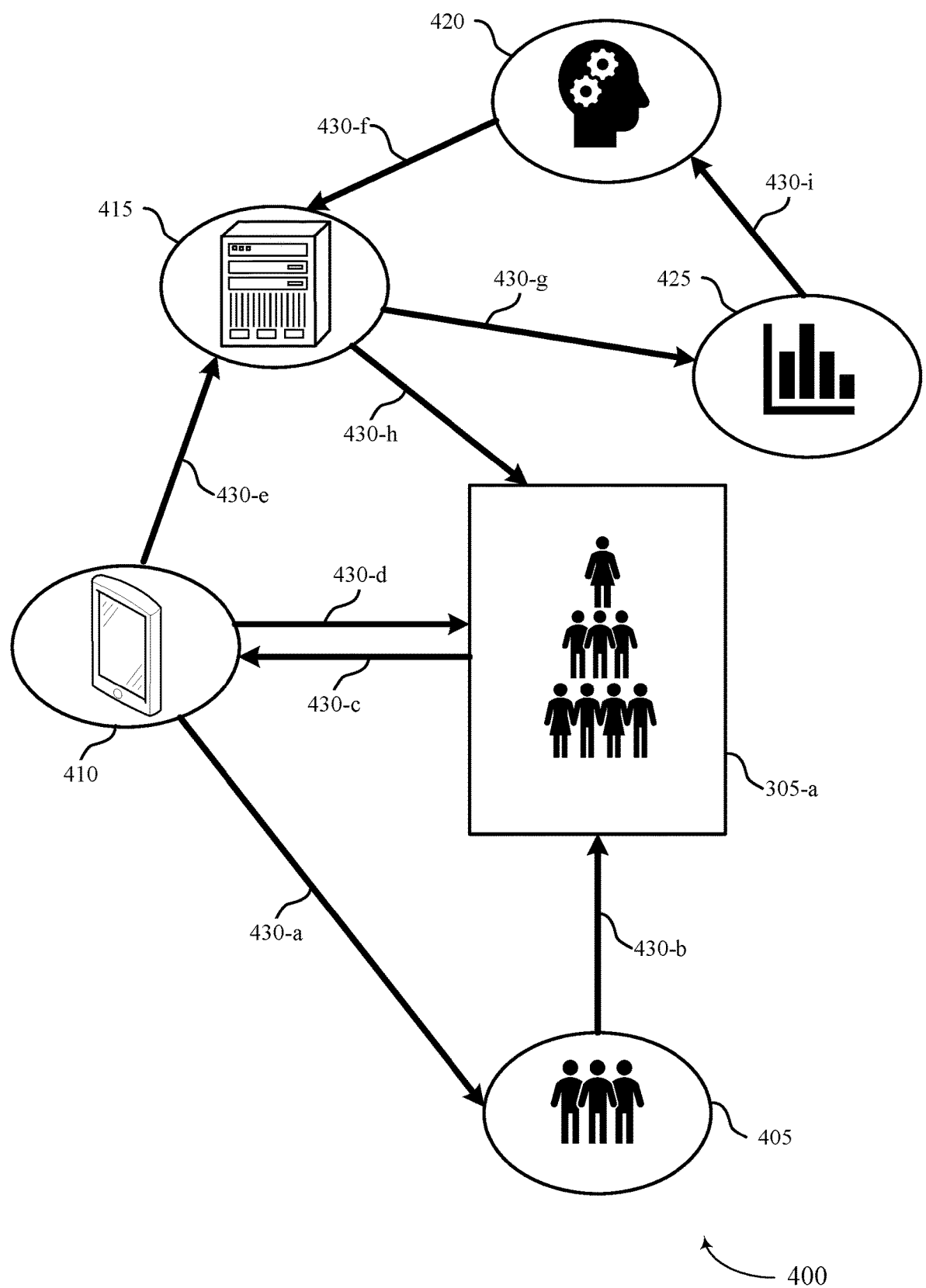
FIG. 4 illustrates an example of a schematic that supports an interactive environmental control system in accordance with examples as disclosed herein.

FIG. 4 illustrates an example of a schematic 400 that supports an interactive environmental control system in accordance with examples as disclosed herein. The schematic 400 may include aspects of a memory system as described with reference to FIGS. 1 and 2. Aspects illustrated by the schematic 400 may be implemented in an environment (e.g., an environment 300) as described with reference to FIG. 3. For example, the schematic 400 may include a building 305-a, which may be an example of a building 305 as described with reference to FIG. 3. The schematic 400 may include a building administrator 405, which may be an example of a building administrator as described with reference to FIG. 3. The schematic 400 may include one or more user devices 410, a temperature calibration system 415, a machine learning component 420, and a data storage component 425. The schematic 400 may illustrate operations of an interactive environmental control system as described herein, which may improve the overall working conditions of the building 305-a (e.g., zones of the building 305-a) as well as its overall energy efficiency.

The schematic 400 may illustrate a quantity of communication links 430 (e.g., the communication links 430-a through 430-i), which may be examples of physical channels (such as a bus). In other examples, the communication links 430 may be an example of wireless signaling and thus may not include any physical channels. In some examples, the type and content of data communicated via the respective communication links 430 may depend on several factors. For example, the data communicated via a respective communication link 430 may depend on whether the system is setting a new temperature for a zone, updating an existing temperature of a zone, maintaining a temperature or managing energy usage, or the like.

The building 305-a may include one or more zones, such as the zones 315 described with reference to FIG. 3, which may each be individually controlled (e.g., managed) by the interactive environmental control system. In some examples, each zone may be in communication with components of the interactive environmental control system schematic as illustrated. For example, each zone of the building 305 may have an associated controller that may communicate (e.g., via the communication links 430-c and 430-d) with the user devices 410 associated with each occupant of the respective zones. By including an associated controller at each zone, the interactive environmental control system may receive environmental inputs (e.g., first environmental inputs, second environmental inputs) and set an environmental condition for each zone based on the individual inputs of users at each zone.

In some examples, each occupant of a zone within the building 305 (e.g., employees, clients, visitors) may be able to input individual preferences to the interactive environmental control system via an application on their user device 410. For example, the user device 410 may be an example of a computing device (e.g., a mobile device, a laptop, a desktop computer). In some examples, the user devices 410 may include a memory device 110 or a host device 105 as described with reference to FIGS. 1 and 2. In some examples, the application may prompt occupants to input their temperature preference on a regular basis (e.g., daily, weekly), while in other examples an occupant may be able to input or change their temperature preference in the application at any time.

In some examples, the application may track the location of the user device 410 as the user moves between zones in the building 305-a. For example, if an employee submits an environmental input while located in a first zone and then physically moves to a second zone (e.g., a different zone), the interactive environmental control system may use their environmental input to determine an environmental condition for the second zone. In some examples, the interactive environmental control system may use location information (e.g., using GPS or another tracking capability of the respective user device 410) to adjust the temperature of one or more zones based on the individual environmental inputs, and taking into account how a user may move through zones throughout the day.

In some examples, a user device 410 may include memory for storing a log of user inputs and other information, such as location information. In some examples, a user device 410 may communicate the log (e.g., or one or more entries of the log that includes environmental inputs and associated secondary environmental inputs) to another component illustrated by the schematic 400. For example, the user device 410 may communicate the log information to the building administrator 405 via the communication link 430-a, to one or more zones of the building 305-a (e.g., to one or more controllers associated with the zones of the building 305-a) via the communication link 430-d, or to the temperature calibration system 415 via the communication link 430-e.

In some examples, the temperature calibration system 415 may receive environmental inputs from one or more user devices 410 and may store a plurality of data entries based on receiving the environmental inputs. The temperature calibration system 415 may include a memory system as described with reference to FIGS. 1-2, and may store the data entries to one or more associated components (e.g., to one or more memory arrays or memory devices). In some examples, aspects of the temperature calibration system may be implemented at or performed by a host device 105 or a memory device 110 as described with reference to FIGS. 1-2. For example, the temperature calibration system 415 may store data received from other components illustrated by the schematic 400 (e.g., the user devices 410, the machine learning component 420) at a memory die that includes volatile memory (e.g., DRAM), non-volatile memory (e.g., FeRAM), or both.

In some examples, the temperature calibration system 415 may communicate temperature adjustments to the individual zones of the building 305-a (e.g., to a controller associated with a respective zone) via the communication link 430-h. For example, the temperature calibration system 415 may determine (e.g., calculate) a change in user preferences for a respective zone and may adjust the temperature for the respective zone in real-time. The temperature calibration system 415 may thus transmit signaling to a controller associated with the respective zone via the communication link 430-h.

The temperature calibration system 415 may determine the environmental condition of each zone (e.g., by performing a calculation based on multiple weighted inputs). In some examples, the temperature calibration system 415 may apply an algorithm to the set of data that includes the environmental inputs and other associated information (e.g., secondary environmental inputs) to determine the temperature for each zone. In some examples, applying the algorithm may include binning the data set based on a range of temperatures, while in other examples applying the algorithm may include binning the data set based on a quantity of users in a zone, and calculating the environmental condition based on weighted average of the temperatures of one or more bins.

In some examples, the environmental condition of each zone may be determined at another location in the schematic 400 (e.g., the data storage component 425, the machine learning component 420) and communicated to the temperature calibration system 415 via a communication link 430. In some examples, the data storage component 425 and the machine learning component 420 may be modules (e.g., subcomponents, logic) included in the temperature calibration system 415. In some examples, the temperature calibration system 415 may maintain an environmental condition at one or more zones for an extended period of time, or may update the environmental condition based on new input preferences or other information.

In some examples, the building administrator 405 may communicate zone-specific information to one or more controllers at one or more zones of the building 305-a via the communication link 430-*b*. For example, zone-specific information may include information related to the building architecture at a zone, information related to a type of work conducted at a zone, or another type of information. The building administrator 405 may additionally or alternatively communicate the zone-specific information to the temperature calibration system 415, such as information related to energy management and energy efficiency at the zones of the building 305. For example, the building administrator 405 may track the overall energy efficiency of the system and may, in some cases, make requests to lower energy use (e.g., the administrator may override an environmental condition of any one zone based on its energy usage or other factors).

To set an environmental condition for any one zone, the data storage component 425 may store information received from the temperature calibration system 415, which may include environmental inputs from the user devices 410, information related to the zones of the building 305-*a*, or inputs from the building administrator 405. In some examples, the information may be grouped based on an associated zone and may be further grouped based on a set or subset of a range of temperatures for each zone (e.g., "bins").

As used herein, the term 'bin' refers to a range of temperatures used to sort environmental inputs and determine an environmental condition for a zone. For example, environmental inputs for a zone may range from 68° F. to 76° F. Accordingly, the zone may be associated with multiple bins, and the range for each bin may be set by the building administrator 405. For example, a first bin may be associated with the temperatures 68° F. to 70° F., a second bin may be associated with 71° F. to 73° F., and a third bin may be associated with 74° F. to 76° F. The temperature calibration system 415 may thus receive environmental inputs from various occupants of a zone, and store the respective environmental inputs to the data storage component 425 (e.g., to bins associated with the data storage component 425).

In a first example, the temperature calibration system 415 may determine an environmental condition for a zone by determining whether any one bin includes more than half of the environmental inputs for the zone. For example, a first zone may be associated with a first bin (e.g., Bin A), a second bin (e.g., Bin B), and a third bin (e.g., Bin C). If a single bin (e.g., Bin B) includes more than half of the environmental inputs for the zone, then the temperature calibration system 415 may determine the environmental condition of the zone by calculating an average of the environmental inputs of the bin having more than half of the total environmental inputs for the zone.

In a second example, the temperature calibration system 415 may determine an environmental condition for a zone after determining that no one bin includes more than half of the environmental inputs for the zone. For example, each of the bins (e.g., Bin A, Bin B, and Bin C) may include a same quantity of the total environmental inputs for the zone. Accordingly, the temperature calibration system 415 may determine the environmental condition of the zone by calculating an average of each environmental input of each bin.

In a third example, the temperature calibration system 415 may determine an environmental condition for a zone after determining that no one bin includes more than half of the environmental inputs for the zone. For example, each of the bins (e.g., Bin A, Bin B, and Bin C) may include less than half of the total environmental inputs for the zone, and two bins may have a same quantity of inputs that is greater than a quantity of inputs of a third bin. Accordingly, the temperature calibration system 415 may determine the environmental condition of the zone by calculating a weighted average of the two bins having the greatest quantity of environmental inputs.

In a fourth example, the temperature calibration system 415 may determine an environmental condition for a zone after determining that no one bin includes more than half of the environmental inputs for the zone. For example, each of the bins (e.g., Bin A, Bin B, and Bin C) may include less than half of the total environmental inputs for the zone, and two bins may have a same quantity of inputs that is less than a quantity of inputs of a third bin. Accordingly, the temperature calibration system 415 may determine the environmental condition of the zone by calculating an average of the bin having the greatest quantity of environmental inputs.

In a fifth example, the temperature calibration system 415 may determine an environmental condition for a zone after determining that no one bin includes more than half of the environmental inputs for the zone. For example, each of the bins (e.g., Bin A, Bin B, and Bin C) may include less than half of the total environmental inputs for the zone, each bin may include a different quantity of inputs. Accordingly, the temperature calibration system 415 may determine the environmental condition of the zone by calculating a weighted average of the two bins that include the greatest quantities of environmental inputs.

In other examples, the data storage component 425 may transmit the data set to the machine learning component 420 via the communication link 430-*i*, or the machine learning component 420 may access the data at the data storage component 425. The machine learning component 420 may determine the environmental condition for one or more zones of the building 305 by applying one or more machine learning techniques to the data set received from the data storage component 425 to generate a predictive model based on the data set. For example, the machine learning component 420 may generate the predictive model using a linear regression model or an Artificial Neural Network (ANN).

In some instances, the machine learning component 420 may use secondary environmental inputs to generate the predictive model. The machine learning component 420 may generate a respective model for each zone of an environment, and may generate the model(s) to predict future temperature preferences based on the stored data. For example, the machine learning component 420 may predict the environmental condition based on the time of day, the quantity of users in a particular zone, a day of the week, or based on other factors in addition to the environmental inputs received form the users of a zone. That is, the data storage component 425 may store a database that includes historical environmental inputs for a plurality of users who have provided environmental inputs for each zone (e.g., over time) and an associated environmental condition of the zone when each environmental input was input (e.g., stored). The data storage component 425 may also store other secondary environmental inputs with each data entry.

The environmental condition of a zone may thus be initially set based on the model generated by the machine learning component 420. Additionally or alternatively, the model may result in the environmental condition of any one zone being adjusted (e.g., updated) based on users entering or exiting the zone. Accordingly, the use of the machine learning component 420 and the model it generates may minimize the frequency at which a user may need to actively input a desired temperature (e.g., a desired environmental input) for use by the temperature calibration system 415.

The components illustrated by the schematic 400 may be utilized to determine an environmental condition for one or more zones of the building 305 based on individual input preferences at the user devices 410. In some examples, there may be additional communication links 430 between varying components of the schematic. By utilizing an algorithm or machine learning to account for individual user preference and occupancy at a zone of the building 305-a, the interactive environmental control system may improve working conditions for many employees and other building occupants, and may in some examples improve energy efficiency at the building 305.

Figure 5:
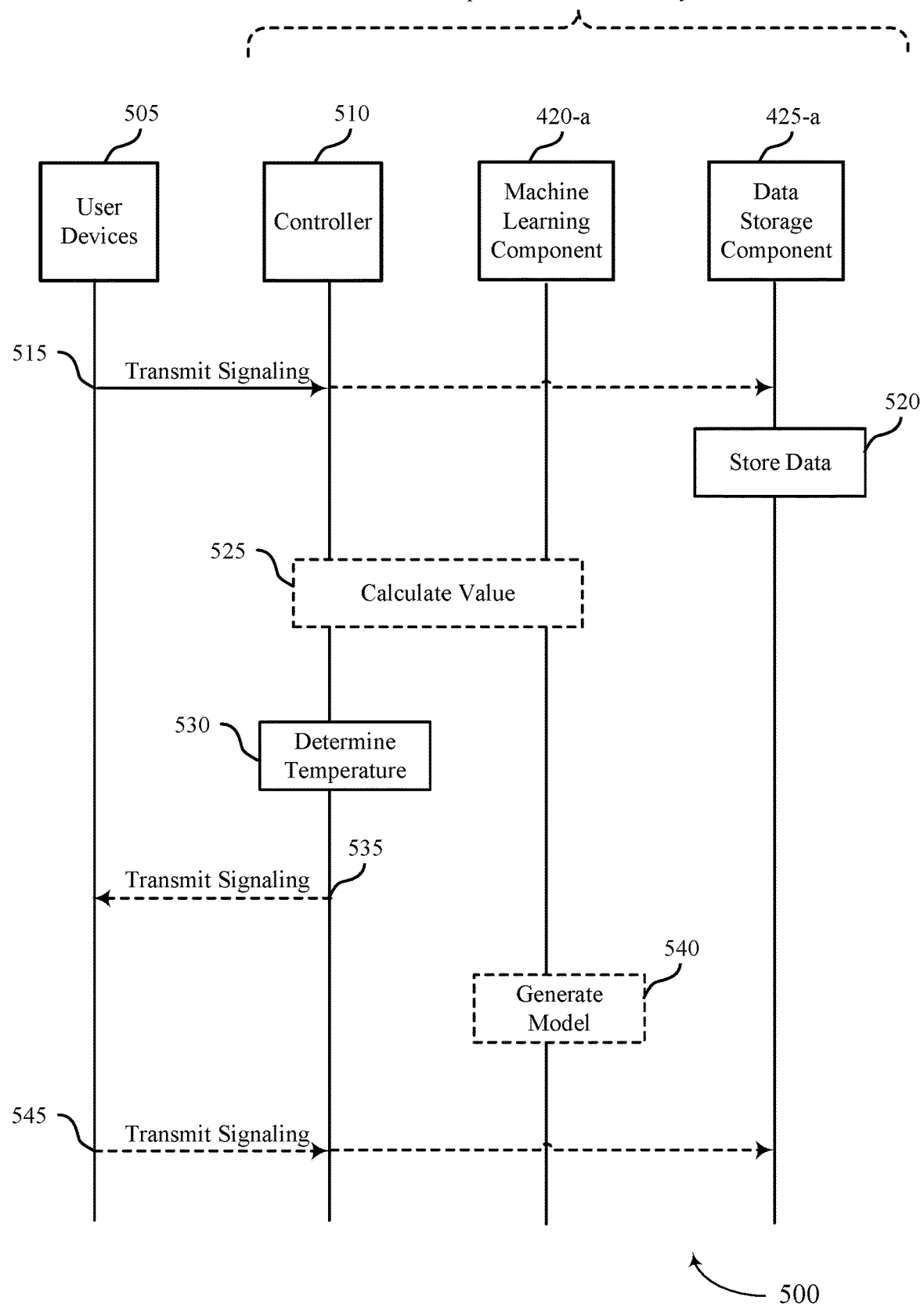
FIG. 5 illustrates an example of a process flow that supports an interactive environmental control system in accordance with examples as disclosed herein.

FIG. 5 illustrates an example of a process flow diagram 500 that supports an interactive environmental control system in accordance with examples as disclosed herein. Aspects of the process flow diagram 500 may be implemented by a memory system, such as a memory system described with reference to FIGS. 1 and 2. Aspects illustrated by the process flow diagram 500 may be implemented at an environment 300, as described with reference to FIG. 3, and may use a quantity of components (e.g., as illustrated in the schematic 400) to determine an environmental condition at each zone of the environment 300, as described with reference to FIG. 4. Alternative examples of the following may be implemented, where some steps are performed in a different order or not at all. Additionally, some steps may be performed by different components or systems, or any combination thereof.

Aspects of the process flow diagram 500 may be implemented by one or more user devices 505, a controller 510, a machine learning component 420-a, and a data storage component 425-a, among other components. In some examples, the controller 510, machine learning component 420-a, and the data storage component 425-a may be components of a temperature calibration system 415-a as described with reference to FIG. 4. Additionally or alternatively, aspects illustrated by the process flow diagram 500 may be implemented as instructions stored in memory (e.g., firmware stored in a memory coupled with the memory system).

At 515, the one or more user devices 505 may transmit signaling to the controller 510 or, in some cases, the data storage component 425-a. For example, in cases when the temperature calibration system 415-a includes the controller 510 and the data storage component 425-a, the user devices 505 may transmit the signaling to the controller 510. In other examples, the user devices 505 may transmit signaling directly to the data storage component 425-a. The signaling transmitted from each user device 505 may include a respective environmental input (e.g., a preferred temperature) and an indication of a location (e.g., a zone occupied by the user). For exemplary purposes only, at 505 signaling may be transmitted from three user devices 505, and environmental inputs may be 68° F., 72° F., and 75° F.

At 520, data may be stored to the data storage component 425-a. For example, the data storage component 425-a may be an example of the data storage component 425 as described with reference to FIG. 4. In some examples, the data storage component 425-a may be an example of volatile (e.g., DRAM) or non-volatile (e.g., FeRAM) memory. The data storage component 425-a may store a log of environmental inputs from a quantity of user devices 505 (e.g., a data set). In some examples, the environmental inputs (e.g., user inputs) may be temperatures, and each environmental input may be associated with a zone of the user.

At 525, the controller 510 or the machine learning component 420-a may calculate a value, such as an average of or based on, the user inputs. In some examples, calculating the value, such as an average or a median or one or more other values, may involve applying an algorithm to the data set to determine an environmental condition for a zone. For example, the controller 510 or the machine learning component 420-a may categorize the data set into bins, and the machine learning component 420-a or the controller 510 may access the binned data set at the data storage component 425-a. Thus, as an example, the environmental input 68° F. may be stored to a first bin (e.g., Bin A), the environmental input 72° F. may be stored to a second bin (e.g., Bin B), and the environmental input 75° may be stored to a third bin (e.g., Bin C).

In some examples, the machine learning component 420-a or the controller 510 may determine that a quantity of environmental inputs included in each bin either satisfies or does not satisfy a threshold quantity of entries. In some examples, the machine learning component 420-a or the controller 510 may select a subset of bins (or all of the bins) based on determining whether each bin satisfies the threshold. The machine learning component 420-a or the controller 510 may then calculate an average or a weighted average of the entries included in the selected bins.

For example, in the case in which one bin may include more than 50% of the total environmental inputs of all of the bins, the machine learning component 420-a or the controller 510 may calculate the average of each temperature in the bin having more than 50% of the total environmental inputs. In another example, if each bin has an equal ratio of environmental inputs (e.g., 33.33%), the machine learning component 420-a or controller 510 may calculate the average of each temperature included in each of the three bins. In another example, if no bin includes 50% or greater of the preferred temperature inputs, the machine learning component 420-a or controller 510 may choose two bins with the greatest quantity of inputs and may calculate a weighted average of the entries included in the two bins.

At 530, the controller 510 may determine an environmental condition for one or more zones of the work environment based on calculating the average of the environmental inputs of one or more bins (e.g., at 525). In some examples, the controller 510 may consider additional factors in the determination, such as information received from a building administrator (e.g., information about a zone or environmental efficiency information) or secondary environmental inputs. In some examples, the controller 510 may individually determine, for each zone of the work environment, whether to maintain a current environmental condition or adjust the temperature based on the environmental inputs from the users currently associated with the zone.

At 535, the controller 510 may transmit signaling to the user devices 505 that includes an indication of the determined temperature of the user's current zone. Additionally or alternatively, the signaling may be transmitted to individual controllers associated with one or more zones of the building and may instruct the respective controller to adjust the environmental condition of its respective zone. In other examples, the controller 510 may transmit signaling to the building administrator, and the signaling may include an estimated energy consumption value for one or more zones that based on the environmental inputs at the respective zones. For example, the signaling to the building administrator may include a heat map of the office building, illustrating each zone's energy consumption.

At 540, the machine learning component 420-a may generate a predictive model for maintain an environmental condition of respective zones based on historical environmental inputs and secondary environmental inputs. For example, the machine learning component 420-a may include, be coupled with, or may receive information from the data storage component 425-a and may apply machine learning techniques (e.g., linear regression models, ANNs) to predict an environmental condition at a zone. In some examples, the accuracy of the model may depend on the quantity of historical data obtained for a respective zone.

Once the predictive model has been generated (e.g., after a sufficient quantity of input preferences have been stored to the data storage component 425-a for a zone) the system may use the model to determine a suggested environmental condition for the zone. The machine learning component 420-a may enable the system to set or maintain an environmental condition at one or more zones, even without user input. For example, in cases when a user forgets or neglects to submit their environmental input at their user device 505, the system may still adjust the temperature at their zone based on the historical data and machine learning prediction.

At 545, the user devices 505 may transmit a second signaling to the controller 510 or the data storage component 425-a. The second signaling may include an updated environmental input for the respective users. Upon receiving the updated environmental input, the temperature calibration system 415-a may repeat the steps at 520 through 540. Thus by utilizing an algorithm or machine learning to account for individual user preference and occupancy at a zone of a building, the interactive environmental control system may improve working conditions for many employees and other building occupants, and may in some examples improve energy efficiency at the building.

Figure 6:
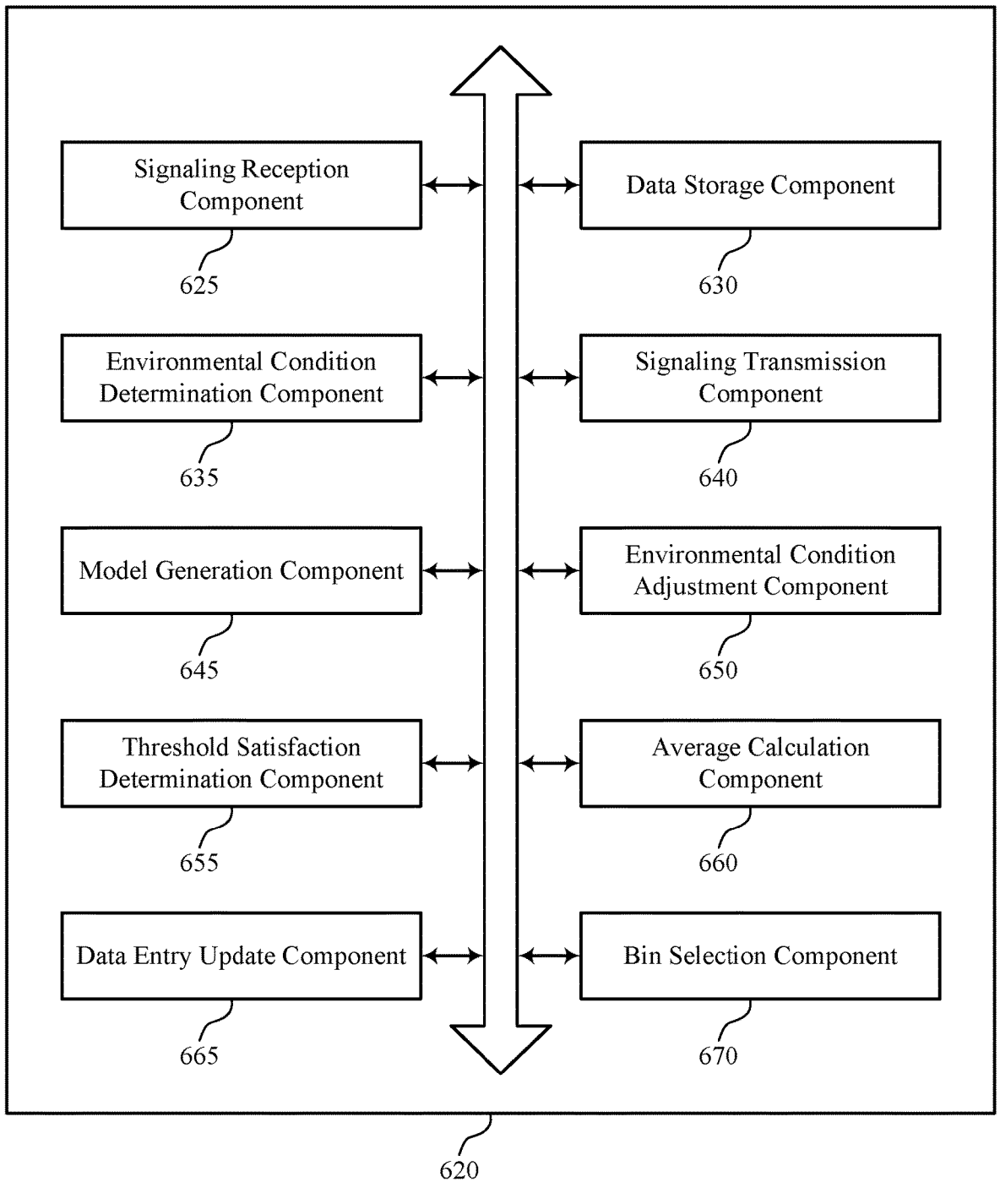
FIGS. 6 and 7 show a block diagram of a memory device that supports an interactive environmental control system in accordance with examples as disclosed herein.

FIG. 6 shows a block diagram 600 of a memory device 620 that supports an interactive environmental control system in accordance with examples as disclosed herein. The memory device 620 may be an example of aspects of a memory device as described with reference to FIGS. 1 through 5. The memory device 620, or various components thereof, may be an example of means for performing various aspects of an interactive environmental control system as described herein.

The memory device 620 may be included in the temperature calibration system 415 as described with reference to FIG. 4. For example, the memory device 620 may include memory, among other components, for storing data associated with the processes described herein.

The memory device 620 may include a signaling reception component 625. In some examples, the signaling reception component 625 may be an example of a receiver included in the memory device (which is included in the temperature calibration system 415 as described with reference to FIG. 4).

The memory device 620 may include a data storage component 630. In some examples, the data storage component 630 may be an example of a memory array included in the memory device 620 (which is included in the temperature calibration system 415 as described with reference to FIG. 4).

The memory device 620 may include an environmental condition determination component 635. In some examples, the environmental condition determination component 635 may be an example of sensor included in the memory device 620 (which is included in the temperature calibration system 415 as described with reference to FIG. 4).

The memory device 620 may include a signaling transmission component 640. In some examples, the signaling transmission component 640 may be an example of a transmitter included in the memory device 620 (which is included in the temperature calibration system 415 as described with reference to FIG. 4).

The memory device 620 may include a model generation component 645. In some examples, the model generation component 645 may be an example of a controller (e.g., a memory controller) included in the memory device 620 (which is included in the temperature calibration system 415 as described with reference to FIG. 4).

The memory device 620 may include an environmental condition adjustment component 650. In some examples, the environmental condition adjustment component 650 may be an example of a controller (e.g., a memory controller) included in the memory device 620 (which is included in the temperature calibration system 415 as described with reference to FIG. 4).

The memory device 620 may include a threshold satisfaction determination component 655. In some examples, the threshold satisfaction determination component 655 may be an example of a controller (e.g., a memory controller) included in the memory device 620 (which is included in the temperature calibration system 415 as described with reference to FIG. 4).

The memory device 620 may include an average calculation component 660. In some examples, the average calculation component 660 may be an example of a controller (e.g., a memory controller) included in the memory device 620 (which is included in the temperature calibration system 415 as described with reference to FIG. 4).

The memory device 620 may include a data entry update component 665. In some examples, the data entry update component 665 may be an example of a controller (e.g., a memory controller) included in the memory device 620 (which is included in the temperature calibration system 415 as described with reference to FIG. 4).

The memory device 620 may include a bin selection component 670. In some examples, the bin selection component 670 may be an example of a controller (e.g., a memory controller) included in the memory device 620 (which is included in the temperature calibration system 415 as described with reference to FIG. 4).

Each of the components described herein may communicate, directly or indirectly, with one another (e.g., via one or more buses).

The signaling reception component 625 may be configured as or otherwise support a means for receiving signaling from a plurality of occupants of a first zone of a plurality of zones, the signaling from each occupant including a respective environmental input for the first zone. In some examples, the signaling reception component 625 may be configured as or otherwise support a means for receiving, from the administrator, a second temperature input for the first zone based at least in part on transmitting the signaling to the administrator, where the environmental condition for the first zone is based at least in part on the second temperature input for the first zone received from the administrator.

In some examples, the signaling reception component 625 may be configured as or otherwise support a means for receiving signaling indicating that one or more first occupants of the plurality of occupants exited the first zone and entered a second zone of the plurality of zones.

The data storage component 630 may be configured as or otherwise support a means for storing a plurality of data entries based at least in part on receiving the signaling from the plurality of occupants of the first zone, each data entry including an environmental input from a respective occupant of the plurality of occupants, and each data entry associated with a respective bin of a plurality of bins based at least in part on a value of the environmental input of the data entry.

The environmental condition determination component 635 may be configured as or otherwise support a means for determining an environmental condition for the first zone based at least in part on storing the plurality of data entries, a quantity of data entries included in each bin of the plurality of bins, and a value of the environmental input of each data entry in at least a subset of the plurality of bins. In some examples, the environmental condition determination component 635 may be configured as or otherwise support a means for determining an environmental condition for the second zone of the plurality of zones based at least in part on updating the data entry associated with the first occupant.

The signaling transmission component 640 may be configured as or otherwise support a means for transmitting, to a controller associated with the plurality of zones, signaling indicating the environmental condition for the first zone. In some examples, the signaling transmission component 640 may be configured as or otherwise support a means for transmitting signaling to an administrator associated with the plurality of zones, where the signaling includes an estimated energy consumption value for the first zone based at least in part on a temperature value received from the respective occupant and a respective second environmental input.

In some examples, the signaling transmission component 640 may be configured as or otherwise support a means for transmitting signaling to at least one occupant associated with a stored data entry, where the signaling includes a suggested temperature value for the first zone based at least in part on a temperature value received from the respective occupant and a respective second environmental input. In some examples, the signaling transmission component 640 may be configured as or otherwise support a means for transmitting, to the controller, signaling indicating the environmental condition for the second zone of the plurality of zones.

In some examples, the signaling transmission component 640 may be configured as or otherwise support a means for transmitting second signaling to the plurality of occupants of the first zone of the plurality of zones, the second signaling indicating the second environmental condition for the first zone determined by the model.

In some examples, the model generation component 645 may be configured as or otherwise support a means for generating a model based at least in part on storing the plurality of data entries, where the suggested temperature value transmitted to the at least one occupant is based at least in part on generating the model.

In some examples, the environmental condition adjustment component 650 may be configured as or otherwise support a means for adjusting, by the controller, the environmental condition of the first zone based at least in part on receiving the signaling indicating the environmental condition for the first zone.

In some examples, to support determining the environmental condition for the first zone, the threshold satisfaction determination component 655 may be configured as or otherwise support a means for determining that the quantity of data entries included in each of a first bin and a second bin of the plurality of bins does not satisfy a threshold value. In some examples, to support determining the environmental condition for the first zone, the threshold satisfaction determination component 655 may be configured as or otherwise support a means for determining that the quantity of data entries included in each of a first bin, a second bin, and a third bin of the plurality of bins does not satisfy a threshold value.

In some examples, to support determining the environmental condition for the first zone, the threshold satisfaction determination component 655 may be configured as or otherwise support a means for determining that the quantity of data entries included in each of a first bin, a second bin, and a third bin of the plurality of bins does not satisfy a threshold value.

In some examples, to support determining the environmental condition for the first zone, the average calculation component 660 may be configured as or otherwise support a means for calculating an average of the environmental input of each data entry included in a third bin of the plurality of bins based at least in part on determining that the quantity of data entries included in each of the first bin and the second bin does not satisfy the threshold value, where the environmental condition for the first zone is based at least in part on calculating the average.

In some examples, to support determining the environmental condition for the first zone, the average calculation component 660 may be configured as or otherwise support a means for calculating a weighted average of the environmental input of each data entry included in the first bin, the second bin, and the third bin of the plurality of bins based at least in part on determining that the quantity of data entries included in each of the first bin, the second bin, and the third bin does not satisfy the threshold value, where the environmental condition for the first zone is based at least in part on calculating the weighted average.

In some examples, to support determining the environmental condition for the first zone, the average calculation component 660 may be configured as or otherwise support a means for calculating a weighted average of the environmental input of each data entry included in two bins of the first bin, the second bin, and the third bin of the plurality of bins based at least in part on determining that the quantity of data entries included in each of the first bin, the second bin, and the third bin does not satisfy the threshold value, where the environmental condition for the first zone is based at least in part on calculating the weighted average.

In some examples, the data entry update component 665 may be configured as or otherwise support a means for updating a data entry associated with the one or more first occupants based at least in part on receiving the signaling indicating that the one or more first occupants exited the first zone and entered the second zone.

In some examples, the bin selection component 670 may be configured as or otherwise support a means for selecting two of the first bin, the second bin, and the third bin of the plurality of bins based for calculating a weighted average of the respective environmental inputs of each data entry based at least in part on determining that the quantity of data entries included in each of the first bin, the second bin, and the third bin does not satisfy the threshold value, where the two bins are selected based on a quantity of data entries included in the first bin, the second bin, and the third bin.

In some examples, the environmental input includes a temperature value. In some examples, each data entry includes a second environmental input associated with the first zone. In some examples, determining the environmental condition of the first zone is based at least in part on the second environmental input. In some examples, the model is generated using a linear regression model or an Artificial Neural Network (ANN). In some examples, each bin of the plurality of bins is associated with a respective range of values of environmental inputs for the first zone.

Figure 7:
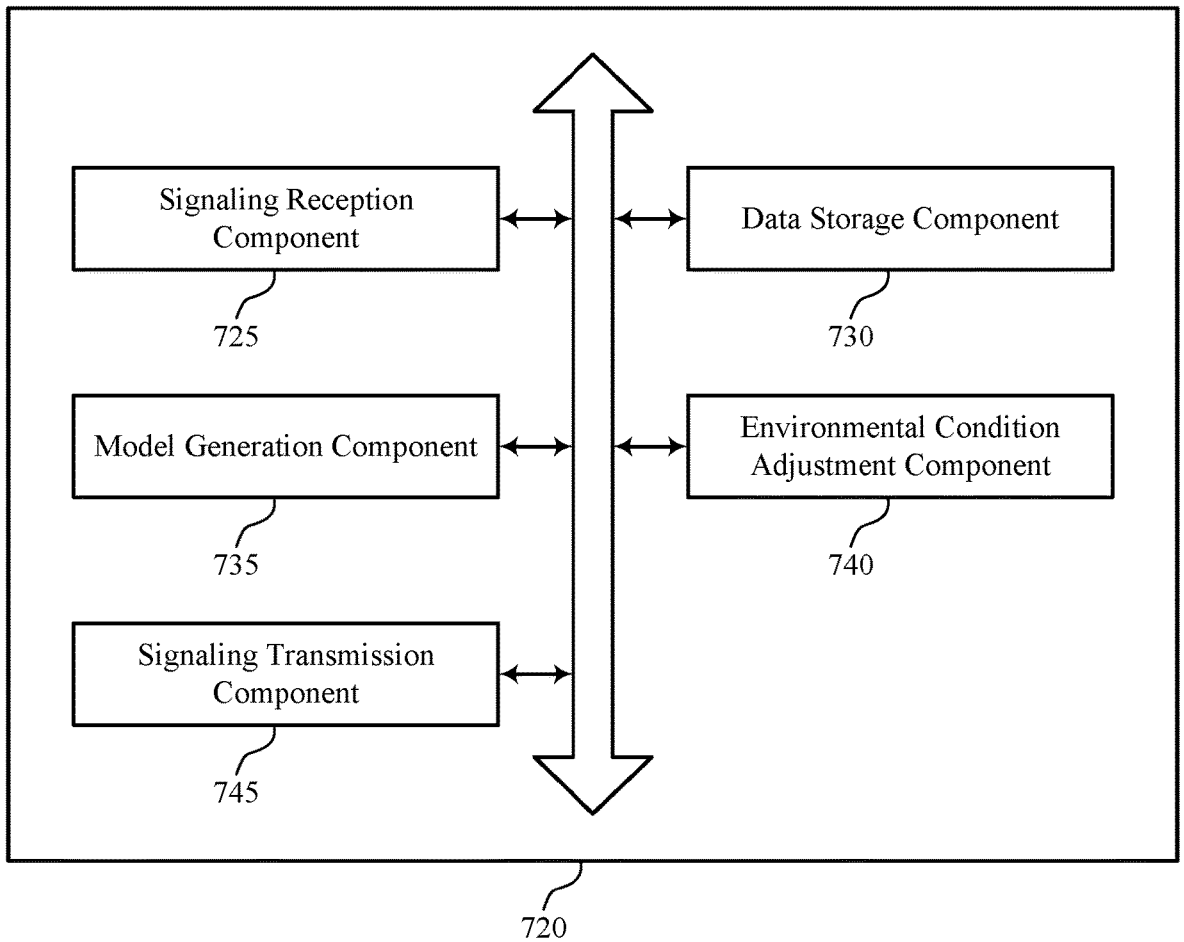

FIG. 7 shows a block diagram 700 of a memory device 720 that supports interactive office temperature control system and algorithm in accordance with examples as disclosed herein. The memory device 720 may be an example of aspects of a memory device as described with reference to FIGS. 1 through 5. The memory device 720, or various components thereof, may be an example of means for performing various aspects of interactive office temperature control system and algorithm as described herein.

The memory device 720 may be included the temperature calibration system 415 as described with reference to FIG. 4. For example, the memory device 720 may include memory, among other components, for storing data associated with the processes described herein.

The memory device 720 may include a signaling reception component 725. In some examples, the signaling reception component 725 may be an example of a receiver included in the memory device 720 (which is included in the temperature calibration system 415 as described with reference to FIG. 4).

The memory device 720 may include a data storage component 730. In some examples, the data storage component 730 may be an example of a memory array included in the memory device 720 (which is included in the temperature calibration system 415 as described with reference to FIG. 4).

The memory device 720 may include a model generation component 735. In some examples, the model generation component 735 may be an example of a controller (e.g., a memory controller) included in the memory device 720 (which is included in the temperature calibration system 415 as described with reference to FIG. 4).

The memory device 720 may include an environmental condition adjustment component 740. In some examples, the environmental condition adjustment component 740 may be an example of a controller (e.g., a memory controller) included in the memory device 720 (which is included in the temperature calibration system 415 as described with reference to FIG. 4).

The memory device 720 may include a signaling transmission component 745. In some examples, the signaling transmission component 745 may be an example of a transmitter included in the memory device 720 (which is included in the temperature calibration system 415 as described with reference to FIG. 4).

Each of the components described herein may communicate, directly or indirectly, with one another (e.g., via one or more buses).

The signaling reception component 725 may be configured as or otherwise support a means for receiving signaling from a plurality of occupants of a first zone of a plurality of zones, the signaling from each occupant including a respective environmental input for the first zone. In some examples, the signaling reception component 725 may be configured as or otherwise support a means for receiving third signaling from the plurality of occupants of the first zone based at least in part on transmitting the second signaling, the third signaling from each occupant including an updated environmental input for the first zone.

In some examples, the signaling reception component 725 may be configured as or otherwise support a means for receiving fourth signaling indicating that one or more additional occupants entered the first zone, the fourth signaling including a respective environmental input for each of the additional occupants that entered the first zone.

The data storage component 730 may be configured as or otherwise support a means for storing a plurality of data entries based at least in part on receiving the signaling from the plurality of occupants of the first zone, each data entry including an environmental input from a respective occupant of the plurality of occupants, and each data entry associated with a respective bin of a plurality of bins based at least in part on a value of the environmental input of the data entry.

The model generation component 735 may be configured as or otherwise support a means for generating a model associated with the respective environmental inputs for the first zone based at least in part on storing the plurality of data entries. In some examples, the model generation component 735 may be configured as or otherwise support a means for updating the model based at least in part on receiving the third signaling. In some examples, the model generation component 735 may be configured as or otherwise support a means for updating the model based at least in part on receiving the fourth signaling.

The environmental condition adjustment component 740 may be configured as or otherwise support a means for adjusting, by a controller associated with the plurality of zones, an environmental condition of the first zone from a first environmental condition to a second environmental condition based at least in part on the model determining the second environmental condition. In some examples, the environmental condition adjustment component 740 may be configured as or otherwise support a means for adjusting, by the controller, the environmental condition of the first zone from the second environmental condition to a third environmental condition based at least in part on the model being updated.

In some examples, the environmental condition adjustment component 740 may be configured as or otherwise support a means for adjusting, by the controller, the environmental condition of the first zone from the second environmental condition to a fourth environmental condition based at least in part on the model being updated.

In some examples, the signaling transmission component 745 may be configured as or otherwise support a means for transmitting second signaling to the plurality of occupants of the first zone of the plurality of zones, the second signaling indicating the second environmental condition for the first zone determined by the model.

Figure 8:
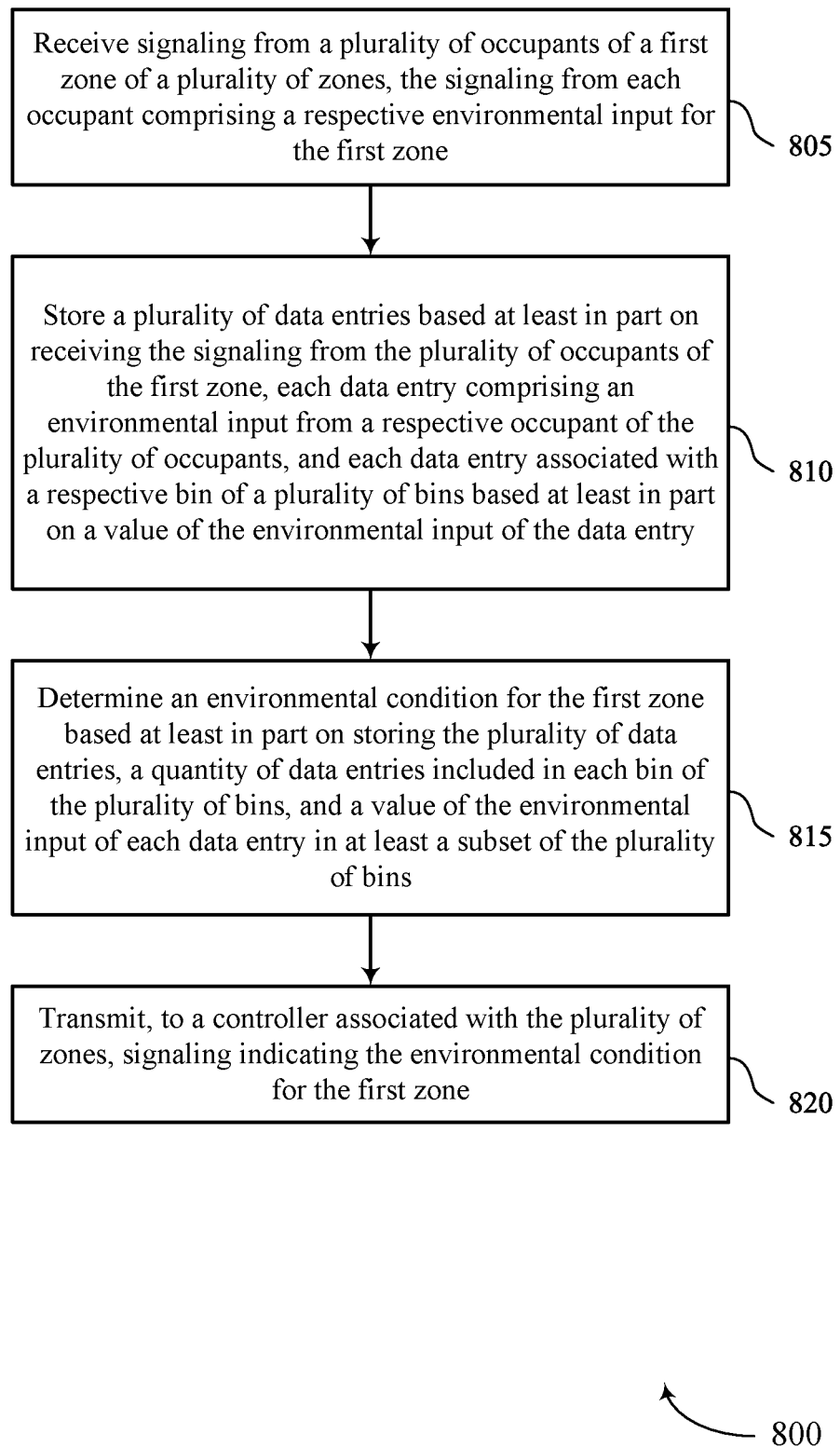
FIGS. 8 and 9 show a flowchart illustrating a method or methods that support an interactive environmental control system in accordance with examples as disclosed herein.

FIG. 8 shows a flowchart illustrating a method 800 that supports interactive office temperature control system and algorithm in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 805, the method may include receiving signaling from a plurality of occupants of a first zone of a plurality of zones, the signaling from each occupant including a respective environmental input for the first zone. The operations of 805 may be performed in accordance with examples as disclosed herein. In some examples, aspects of the operations of 805 may be performed by a signaling reception component 625 as described with reference to FIG. 6.

At 810, the method may include storing a plurality of data entries based at least in part on receiving the signaling from the plurality of occupants of the first zone, each data entry including an environmental input from a respective occupant of the plurality of occupants, and each data entry associated with a respective bin of a plurality of bins based at least in part on a value of the environmental input of the data entry. The operations of 810 may be performed in accordance with examples as disclosed herein. In some examples, aspects of the operations of 810 may be performed by a data storage component 630 as described with reference to FIG. 6.

At 815, the method may include determining an environmental condition for the first zone based at least in part on storing the plurality of data entries, a quantity of data entries included in each bin of the plurality of bins, and a value of the environmental input of each data entry in at least a subset of the plurality of bins. The operations of 815 may be performed in accordance with examples as disclosed herein. In some examples, aspects of the operations of 815 may be performed by an environmental condition determination component 635 as described with reference to FIG. 6.

At 820, the method may include transmitting, to a controller associated with the plurality of zones, signaling indicating the environmental condition for the first zone. The operations of 820 may be performed in accordance with examples as disclosed herein. In some examples, aspects of the operations of 820 may be performed by a signaling transmission component 640 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving signaling from a plurality of occupants of a first zone of a plurality of zones, the signaling from each occupant including a respective environmental input for the first zone; storing a plurality of data entries based at least in part on receiving the signaling from the plurality of occupants of the first zone, each data entry including an environmental input from a respective occupant of the plurality of occupants, and each data entry associated with a respective bin of a plurality of bins based at least in part on a value of the environmental input of the data entry; determining an environmental condition for the first zone based at least in part on storing the plurality of data entries, a quantity of data entries included in each bin of the plurality of bins, and a value of the environmental input of each data entry in at least a subset of the plurality of bins; and transmitting, to a controller associated with the plurality of zones, signaling indicating the environmental condition for the first zone.

Aspect 2: The method, apparatus, or non-transitory computer-readable medium of aspect 1 where determining the environmental condition for the first zone includes operations, features, circuitry, logic, means, or instructions, or any combination thereof for determining that the quantity of data entries included in each of a first bin and a second bin of the plurality of bins does not satisfy a threshold value and calculating an average of the environmental input of each data entry included in a third bin of the plurality of bins based at least in part on determining that the quantity of data entries included in each of the first bin and the second bin does not satisfy the threshold value, where the environmental condition for the first zone is based at least in part on calculating the average.

Aspect 3: The method, apparatus, or non-transitory computer-readable medium of any of aspects 1 through 2 where determining the environmental condition for the first zone includes operations, features, circuitry, logic, means, or instructions, or any combination thereof for determining that the quantity of data entries included in each of a first bin, a second bin, and a third bin of the plurality of bins does not satisfy a threshold value and calculating a weighted average of the environmental input of each data entry included in the first bin, the second bin, and the third bin of the plurality of bins based at least in part on determining that the quantity of data entries included in each of the first bin, the second bin, and the third bin does not satisfy the threshold value, where the environmental condition for the first zone is based at least in part on calculating the weighted average.

Aspect 4: The method, apparatus, or non-transitory computer-readable medium of any of aspects 1 through 3 where determining the environmental condition for the first zone includes operations, features, circuitry, logic, means, or instructions, or any combination thereof for determining that the quantity of data entries included in each of a first bin, a second bin, and a third bin of the plurality of bins does not satisfy a threshold value and calculating a weighted average of the environmental input of each data entry included in two bins of the first bin, the second bin, and the third bin of the plurality of bins based at least in part on determining that the quantity of data entries included in each of the first bin, the second bin, and the third bin does not satisfy the threshold value, where the environmental condition for the first zone is based at least in part on calculating the weighted average.

Aspect 5: The method, apparatus, or non-transitory computer-readable medium of aspect 4, further including operations, features, circuitry, logic, means, or instructions, or any combination thereof for selecting two of the first bin, the second bin, and the third bin of the plurality of bins based for calculating a weighted average of the respective environmental inputs of each data entry based at least in part on determining that the quantity of data entries included in each of the first bin, the second bin, and the third bin does not satisfy the threshold value, where the two bins are selected based on a quantity of data entries included in the first bin, the second bin, and the third bin.

Aspect 6: The method, apparatus, or non-transitory computer-readable medium of any of aspects 1 through 5 where the environmental input includes a temperature value; each data entry includes a second environmental input associated with the first zone; and determining the environmental condition of the first zone is based at least in part on the second environmental input.

Aspect 7: The method, apparatus, or non-transitory computer-readable medium of aspect 6, further including operations, features, circuitry, logic, means, or instructions, or any combination thereof for transmitting signaling to an administrator associated with the plurality of zones, where the signaling includes an estimated energy consumption value for the first zone based at least in part on a temperature value received from the respective occupant and a respective second environmental input and receiving, from the administrator, a second temperature input for the first zone based at least in part on transmitting the signaling to the administrator, where the environmental condition for the first zone is based at least in part on the second temperature input for the first zone received from the administrator.

Aspect 8: The method, apparatus, or non-transitory computer-readable medium of any of aspects 6 through 7, further including operations, features, circuitry, logic, means, or instructions, or any combination thereof for transmitting signaling to at least one occupant associated with a stored data entry, where the signaling includes a suggested temperature value for the first zone based at least in part on a temperature value received from the respective occupant and a respective second environmental input.

Aspect 9: The method, apparatus, or non-transitory computer-readable medium of aspect 8, further including operations, features, circuitry, logic, means, or instructions, or any combination thereof for generating a model based at least in part on storing the plurality of data entries, where the suggested temperature value transmitted to the at least one occupant is based at least in part on generating the model.

Aspect 10: The method, apparatus, or non-transitory computer-readable medium of aspect 9 where the model is generated using a linear regression model or an Artificial Neural Network (ANN).

Aspect 11: The method, apparatus, or non-transitory computer-readable medium of any of aspects 1 through 10, further including operations, features, circuitry, logic, means, or instructions, or any combination thereof for receiving signaling indicating that one or more first occupants of the plurality of occupants exited the first zone and entered a second zone of the plurality of zones; updating a data entry associated with the one or more first occupants based at least in part on receiving the signaling indicating that the one or more first occupants exited the first zone and entered the second zone; determining an environmental condition for the second zone of the plurality of zones based at least in part on updating the data entry associated with the first occupant; and transmitting, to the controller, signaling indicating the environmental condition for the second zone of the plurality of zones.

Aspect 12: The method, apparatus, or non-transitory computer-readable medium of any of aspects 1 through 11, further including operations, features, circuitry, logic, means, or instructions, or any combination thereof for adjusting, by the controller, the environmental condition of the first zone based at least in part on receiving the signaling indicating the environmental condition for the first zone.

Aspect 13: The method, apparatus, or non-transitory computer-readable medium of any of aspects 1 through 12 where each bin of the plurality of bins is associated with a respective range of values of environmental inputs for the first zone.

Figure 9:
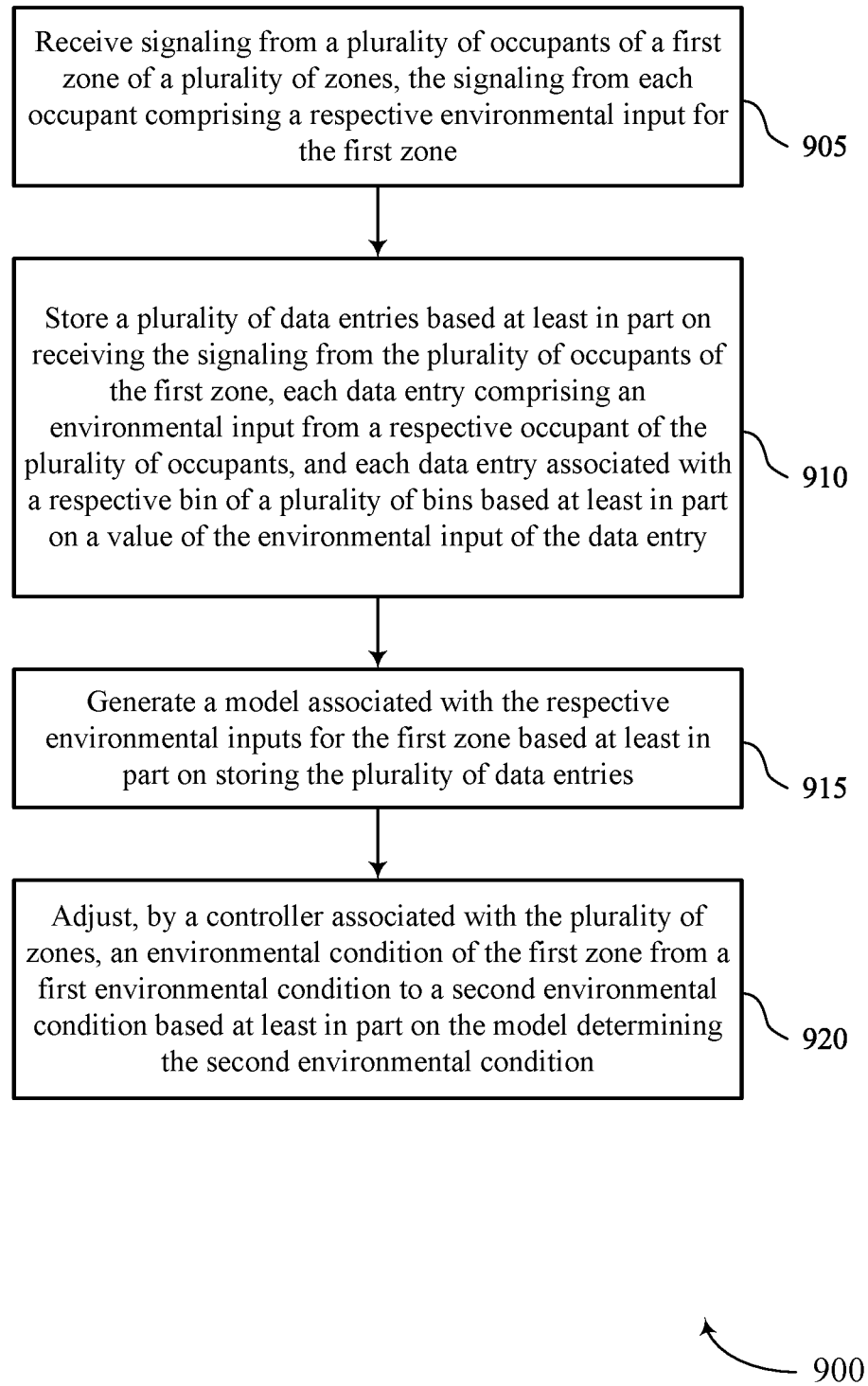

FIG. 9 shows a flowchart illustrating a method 900 that supports interactive office temperature control system and algorithm in accordance with examples as disclosed herein. The operations of method 900 may be implemented by a memory device or its components as described herein. For example, the operations of method 900 may be performed by a memory device as described with reference to FIGS. 1 through 5 and 7. In some examples, a memory device may execute a set of instructions to control the functional elements of the device to perform the described functions. Additionally or alternatively, the memory device may perform aspects of the described functions using special-purpose hardware.

At 905, the method may include receiving signaling from a plurality of occupants of a first zone of a plurality of zones, the signaling from each occupant including a respective environmental input for the first zone. The operations of 905 may be performed in accordance with examples as disclosed herein. In some examples, aspects of the operations of 905 may be performed by a signaling reception component 725 as described with reference to FIG. 7.

At 910, the method may include storing a plurality of data entries based at least in part on receiving the signaling from the plurality of occupants of the first zone, each data entry including an environmental input from a respective occupant of the plurality of occupants, and each data entry associated with a respective bin of a plurality of bins based at least in part on a value of the environmental input of the data entry. The operations of 910 may be performed in accordance with examples as disclosed herein. In some examples, aspects of the operations of 910 may be performed by a data storage component 730 as described with reference to FIG. 7.

At 915, the method may include generating a model associated with the respective environmental inputs for the first zone based at least in part on storing the plurality of data entries. The operations of 915 may be performed in accordance with examples as disclosed herein. In some examples, aspects of the operations of 915 may be performed by a model generation component 735 as described with reference to FIG. 7.

At 920, the method may include adjusting, by a controller associated with the plurality of zones, an environmental condition of the first zone from a first environmental condition to a second environmental condition based at least in part on the model determining the second environmental condition. The operations of 920 may be performed in accordance with examples as disclosed herein. In some examples, aspects of the operations of 920 may be performed by an environmental condition adjustment component 740 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving signaling from a plurality of occupants of a first zone of a plurality of zones, the signaling from each occupant including a respective environmental input for the first zone; storing a plurality of data entries based at least in part on receiving the signaling from the plurality of occupants of the first zone, each data entry including an environmental input from a respective occupant of the plurality of occupants, and each data entry associated with a respective bin of a plurality of bins based at least in part on a value of the environmental input of the data entry; generating a model associated with the respective environmental inputs for the first zone based at least in part on storing the plurality of data entries; and adjusting, by a controller associated with the plurality of zones, an environmental condition of the first zone from a first environmental condition to a second environmental condition based at least in part on the model determining the second environmental condition.

Aspect 15: The method, apparatus, or non-transitory computer-readable medium of aspect 14, further including operations, features, circuitry, logic, means, or instructions, or any combination thereof for transmitting second signaling to the plurality of occupants of the first zone of the plurality of zones, the second signaling indicating the second environmental condition for the first zone determined by the model; receiving third signaling from the plurality of occupants of the first zone based at least in part on transmitting the second signaling, the third signaling from each occupant including an updated environmental input for the first zone; updating the model based at least in part on receiving the third signaling; and adjusting, by the controller, the environmental condition of the first zone from the second environmental condition to a third environmental condition based at least in part on the model being updated.

Aspect 16: The method, apparatus, or non-transitory computer-readable medium of any of aspects 14 through 15, further including operations, features, circuitry, logic, means, or instructions, or any combination thereof for receiving fourth signaling indicating that one or more additional occupants entered the first zone, the fourth signaling including a respective environmental input for each of the additional occupants that entered the first zone; updating the model based at least in part on receiving the fourth signaling; and adjusting, by the controller, the environmental condition of the first zone from the second environmental condition to a fourth environmental condition based at least in part on the model being updated.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving signaling, at a first controller, from a plurality of user devices located within a first zone of a plurality of zones, the signaling from each user device comprising a respective environmental input for the first zone;
    storing, at a memory device, a plurality of data entries based at least in part on receiving the signaling from the plurality of user devices located within the first zone, each data entry comprising an environmental input from a respective occupant of the plurality of user devices, and each data entry associated with a respective bin of a plurality of bins based at least in part on a value of the environmental input of each data entry;
    determining, by the first controller, an environmental condition for the first zone based at least in part on the stored plurality of data entries, a quantity of data entries included in each bin of the plurality of bins, and a value of the environmental input of each data entry in at least a subset of the plurality of bins, wherein determining the environmental condition for the first zone comprises:
        determining, by the first controller, that the quantity of data entries included in each of a first bin and a second bin of the plurality of bins does not satisfy a threshold value and that the quantity of data entries in a third bin of the plurality of bins satisfies the threshold value; and
        calculating, by the first controller, an average of the environmental input of each data entry included in the third bin of the plurality of bins based at least in part on determining that the quantity of data entries included in each of the first bin and the second bin does not satisfy the threshold value, wherein the environmental condition for the first zone is based at least in part on calculating the average;
    transmitting, to a plurality of second controllers each associated with a respective zone of the plurality of zones, signaling indicating the environmental condition for the first zone; and
    adjusting, by one of the plurality of second controllers, the environmental condition of the first zone based at least in part on the signaling indicating the environmental condition for the first zone.

2. The method of claim 1, wherein:
    the environmental input comprises a temperature value,
    each data entry comprises a second environmental input associated with the first zone, and
    determining the environmental condition of the first zone is based at least in part on the second environmental input.

3. The method of claim 2, further comprising:
    transmitting, from the first controller, signaling to an administrator device associated with the plurality of zones, wherein the signaling comprises an estimated energy consumption value for the first zone based at least in part on the temperature value received from the respective user device and a respective second environmental input; and receiving, from the administrator device, a second temperature input for the first zone based at least in part on transmitting the signaling to the administrator device, wherein the environmental condition for the first zone is based at least in part on the second temperature input for the first zone received from the administrator device.

4. The method of claim 2, further comprising:
transmitting, from the first controller, signaling to at least one user device associated with a stored data entry, wherein the signaling comprises a suggested temperature value for the first zone based at least in part on the temperature value received from the respective user device and a respective second environmental input.

5. The method of claim 4, further comprising:
generating, at a machine learning component, a model based at least in part on storing the plurality of data entries, wherein the suggested temperature value transmitted to the at least one user device is based at least in part on generating the model.

6. The method of claim 5, wherein the model is generated using a linear regression model or an Artificial Neural Network (ANN).

7. The method of claim 1, further comprising:
receiving signaling, at the first controller, indicating that one or more first user devices of the plurality of user devices exited the first zone and entered a second zone of the plurality of zones;
updating, at the first controller, a data entry associated with the one or more first user devices based at least in part on receiving the signaling indicating that the one or more first user devices exited the first zone and entered the second zone;
determining, at the first controller, an environmental condition for the second zone of the plurality of zones based at least in part on updating the data entry associated with the one or more first user devices; and
transmitting, to the plurality of second controllers, signaling indicating the environmental condition for the second zone of the plurality of zones.

8. The method of claim 1, wherein each bin of the plurality of bins is associated with a respective range of values of environmental inputs for the first zone.

9. A method, comprising:
receiving signaling, at a first controller, from a plurality of user devices located within a first zone of a plurality of zones, the signaling from each user device comprising a respective environmental input for the first zone;
storing, at a memory device, a plurality of data entries based at least in part on receiving the signaling from the plurality of user devices located within the first zone, each data entry comprising an environmental input from a respective occupant of the plurality of user devices, and each data entry associated with a respective bin of a plurality of bins based at least in part on a value of the environmental input of each data entry;
determining, by the first controller, an environmental condition for the first zone based at least in part on the stored plurality of data entries, a quantity of data entries included in each bin of the plurality of bins, and a value of the environmental input of each data entry in at least a subset of the plurality of bins, wherein determining the environmental condition for the first zone comprises:

determining, by the first controller, that the quantity of data entries included in each of a first bin, a second bin, and a third bin of the plurality of bins does not satisfy a threshold value; and
calculating, by the first controller, a weighted average of the environmental input of each data entry included in the first bin, the second bin, and the third bin of the plurality of bins based at least in part on determining that the quantity of data entries included in each of the first bin, the second bin, and the third bin does not satisfy the threshold value, wherein the environmental condition for the first zone is based at least in part on calculating the weighted average;
transmitting, to a plurality of second controllers each associated with a respective zone of the plurality of zones, signaling indicating the environmental condition for the first zone; and
adjusting, by one of the plurality of second controllers, the environmental condition of the first zone based at least in part on the signaling indicating the environmental condition for the first zone.

10. A method, comprising:
receiving signaling, at a first controller, from a plurality of user devices located within a first zone of a plurality of zones, the signaling from each user device comprising a respective environmental input for the first zone;
storing, at a memory device, a plurality of data entries based at least in part on receiving the signaling from the plurality of user devices located within the first zone, each data entry comprising an environmental input from a respective occupant of the plurality of user devices, and each data entry associated with a respective bin of a plurality of bins based at least in part on a value of the environmental input of each data entry;
determining, by the first controller, an environmental condition for the first zone based at least in part on the stored plurality of data entries, a quantity of data entries included in each bin of the plurality of bins, and a value of the environmental input of each data entry in at least a subset of the plurality of bins, wherein determining the environmental condition for the first zone comprises:
determining, by the first controller, that the quantity of data entries included in each of a first bin, a second bin, and a third bin of the plurality of bins does not satisfy a threshold value; and
calculating, by the first controller, a weighted average of the environmental input of each data entry included in two bins of the first bin, the second bin, and the third bin of the plurality of bins based at least in part on determining that the quantity of data entries included in each of the first bin, the second bin, and the third bin does not satisfy the threshold value, wherein the environmental condition for the first zone is based at least in part on calculating the weighted average;
transmitting, to a plurality of second controllers each associated with a respective zone of the plurality of zones, signaling indicating the environmental condition for the first zone; and
adjusting, by one of the plurality of second controllers, the environmental condition of the first zone based at least in part on the signaling indicating the environmental condition for the first zone.

11. The method of claim 10, further comprising:
selecting, by the first controller, two of the first bin, the second bin, and the third bin of the plurality of bins for calculating the weighted average of the respective environmental inputs of each data entry based at least in part on determining that the quantity of data entries included in each of the first bin, the second bin, and the third bin does not satisfy the threshold value, wherein the two bins are selected based on a quantity of data entries included in the first bin, the second bin, and the third bin.

12. A non-transitory computer-readable medium storing code, the code comprising instructions executable by one or more processors to:
receive signaling, at a first controller, from a plurality of user devices located within a first zone of a plurality of zones, the signaling from each user device comprising a respective environmental input for the first zone;
store, at a memory device, a plurality of data entries based at least in part on receiving the signaling from the plurality of user devices located within the first zone, each data entry comprising an environmental input from a respective occupant of the plurality of user devices, and each data entry associated with a respective bin of a plurality of bins based at least in part on a value of the environmental input of each data entry;
determine, by the first controller, an environmental condition for the first zone based at least in part on the stored plurality of data entries, a quantity of data entries included in each bin of the plurality of bins, and a value of the environmental input of each data entry in at least a subset of the plurality of bins, wherein the instructions to determine the environmental condition for the first zone are executable by the one or more processors to:
determine, by the first controller, that the quantity of data entries included in each of a first bin and a second bin of the plurality of bins does not satisfy a threshold value and that the quantity of data entries in a third bin of the plurality of bins satisfies the threshold value; and
calculate, by the first controller, an average of the environmental input of each data entry included in the third bin of the plurality of bins based at least in part on determining that the quantity of data entries included in each of the first bin and the second bin does not satisfy the threshold value, wherein the environmental condition for the first zone is based at least in part on calculating the average;
transmit, to a plurality of second controllers each associated with a respective zone of the plurality of zones, signaling indicating the environmental condition for the first zone; and
adjust, by one of the plurality of second controllers, the environmental condition of the first zone based at least in part on the signaling indicating the environmental condition for the first zone.

13. The non-transitory computer-readable medium of claim 12, wherein:
the environmental input comprises a temperature value, each data entry comprises a second environmental input associated with the first zone, and
determining the environmental condition of the first zone is based at least in part on the second environmental input.

14. The non-transitory computer-readable medium of claim 13, wherein the instructions are further executable by the one or more processors to:
transmit, from the first controller, signaling to an administrator device associated with the plurality of zones, wherein the signaling comprises an estimated energy consumption value for the first zone based at least in part on the temperature value received from the respective user device and a respective second environmental input; and
receive, from the administrator device, a second temperature input for the first zone based at least in part on transmitting the signaling to the administrator device, wherein the environmental condition for the first zone is based at least in part on the second temperature input for the first zone received from the administrator device.

15. The non-transitory computer-readable medium of claim 13, wherein the instructions are further executable by the one or more processors to:
transmit, from the first controller, signaling to at least one user device associated with a stored data entry, wherein the signaling comprises a suggested temperature value for the first zone based at least in part on the temperature value received from the respective user device and a respective second environmental input.

16. The non-transitory computer-readable medium of claim 15, wherein the instructions are further executable by the one or more processors to:
generate, at a machine learning component, a model based at least in part on storing the plurality of data entries, wherein the suggested temperature value transmitted to the at least one user device is based at least in part on generating the model.

17. A non-transitory computer-readable medium storing code, the code comprising instructions executable by one or more processors to:
receive signaling, at a first controller, from a plurality of user devices located within a first zone of a plurality of zones, the signaling from each user device comprising a respective environmental input for the first zone;
store, at a memory device, a plurality of data entries based at least in part on receiving the signaling from the plurality of user devices located within the first zone, each data entry comprising an environmental input from a respective occupant of the plurality of user devices, and each data entry associated with a respective bin of a plurality of bins based at least in part on a value of the environmental input of each data entry;
determine, by the first controller, an environmental condition for the first zone based at least in part on the stored plurality of data entries, a quantity of data entries included in each bin of the plurality of bins, and a value of the environmental input of each data entry in at least a subset of the plurality of bins, wherein the instructions to determine the environmental condition for the first zone are executable by the one or more processors to:
determine, by the first controller, that the quantity of data entries included in each of a first bin, a second bin, and a third bin of the plurality of bins does not satisfy a threshold value; and
calculate, by the first controller, a weighted average of the environmental input of each data entry included in the first bin, the second bin, and the third bin of the plurality of bins based at least in part on determining that the quantity of data entries included in each of the first bin, the second bin, and the third bin does not satisfy the threshold value, wherein the environmental condition for the first zone is based at least in part on calculating the weighted average;

transmit, to a plurality of second controllers each associated with a respective zone of the plurality of zones, signaling indicating the environmental condition for the first zone; and adjust, by one of the plurality of second controllers, the environmental condition of the first zone based at least in part on the signaling indicating the environmental condition for the first zone.

18. A non-transitory computer-readable medium storing code, the code comprising instructions executable by one or more processors to:

receive signaling, at a first controller, from a plurality of user devices located within a first zone of a plurality of zones, the signaling from each user device comprising a respective environmental input for the first zone;

store, at a memory device, a plurality of data entries based at least in part on receiving the signaling from the plurality of user devices located within the first zone, each data entry comprising an environmental input from a respective occupant of the plurality of user devices, and each data entry associated with a respective bin of a plurality of bins based at least in part on a value of the environmental input of each data entry;

determine, by the first controller, an environmental condition for the first zone based at least in part on the stored plurality of data entries, a quantity of data entries included in each bin of the plurality of bins, and a value of the environmental input of each data entry in at least a subset of the plurality of bins, wherein the instructions to determine the environmental condition for the first zone are executable by the one or more processors to:

determine, by the first controller, that the quantity of data entries included in each of a first bin, a second bin, and a third bin of the plurality of bins does not satisfy a threshold value; and calculate, by the first controller, a weighted average of the environmental input of each data entry included in two bins of the first bin, the second bin, and the third bin of the plurality of bins based at least in part on determining that the quantity of data entries included in each of the first bin, the second bin, and the third bin does not satisfy the threshold value, wherein the environmental condition for the first zone is based at least in part on calculating the weighted average;

transmit, to a plurality of second controllers each associated with a respective zone of the plurality of zones, signaling indicating the environmental condition for the first zone; and adjust, by one of the plurality of second controllers, the environmental condition of the first zone based at least in part on the signaling indicating the environmental condition for the first zone.

19. The non-transitory computer-readable medium of claim 18, wherein the instructions are further executable by the one or more processors to:

select, by the first controller, two of the first bin, the second bin, and the third bin of the plurality of bins for calculating the weighted average of the respective environmental inputs of each data entry based at least in part on determining that the quantity of data entries included in each of the first bin, the second bin, and the third bin does not satisfy the threshold value, wherein the two bins are selected based on a quantity of data entries included in the first bin, the second bin, and the third bin.

20. A method, comprising:

receiving signaling, at a first controller, from a plurality of user devices located within a first zone of a plurality of zones, the signaling from each user device comprising a respective environmental input for the first zone;

storing, at a memory device, a plurality of data entries based at least in part on receiving the signaling from the plurality of user devices located within the first zone, each data entry comprising an environmental input from a respective occupant of the plurality of user devices, and each data entry associated with a respective bin of a plurality of bins based at least in part on a value of the environmental input of each data entry;

determining, by the first controller, an environmental condition for the first zone based at least in part on the stored plurality of data entries, a quantity of data entries included in each bin of the plurality of bins, and a value of the environmental input of each data entry in at least a subset of the plurality of bins;

determining, by the first controller, that the quantity of data entries included in each of a first bin and a second bin of the plurality of bins does not satisfy a threshold value and that the quantity of data entries in a third bin of the plurality of bins satisfies the threshold value; and calculating, by the first controller, an average of the environmental input of each data entry included in the third bin of the plurality of bins based at least in part on determining that the quantity of data entries included in each of the first bin and the second bin does not satisfy the threshold value, wherein the environmental condition for the first zone is based at least in part on calculating the average;

generating a model associated with the respective environmental inputs for the first zone based at least in part on the stored plurality of data entries; and adjusting, by a second controller of a plurality of second controllers each associated with the plurality of zones, an environmental condition of the first zone from a first environmental condition to a second environmental condition based at least in part on the model determining the second environmental condition.

21. The method of claim 20, further comprising:

transmitting second signaling to the plurality of user devices located within the first zone of the plurality of zones, the second signaling indicating the second environmental condition for the first zone determined by the model;

receiving third signaling from the plurality of user devices located within the first zone based at least in part on transmitting the second signaling, the third signaling from each user device comprising an updated environmental input for the first zone;

updating the model based at least in part on receiving the third signaling; and adjusting, by the second controller of the plurality of second controllers, the environmental condition of the first zone from the second environmental condition to a third environmental condition based at least in part on the model being updated.

22. The method of claim 20, further comprising:

receiving fourth signaling indicating that one or more additional occupants entered the first zone, the fourth signaling comprising a respective environmental input for each of the additional occupants that entered the first zone;

updating the model based at least in part on receiving the fourth signaling; and adjusting, by the second controller of the plurality of second controllers, the environmental condition of the first zone from the second environmental condition to a fourth environmental condition based at least in part on the model being updated.

\* \* \* \* \*